United States Patent
Noda et al.

(10) Patent No.: US 7,546,107 B2
(45) Date of Patent: Jun. 9, 2009

(54) APPARATUS AND METHOD FOR INTERFERENCE CANCELLER IN A HIGH FREQUENCY RECEIVER AND TRANSMITTER

(75) Inventors: Masaaki Noda, Gifu (JP); Motoyoshi Kitagawa, Gifu (JP)

(73) Assignee: Panasonic Corporation, Osaka (JP)

( * ) Notice: Subject to any disclaimer, the term of this patent is extended or adjusted under 35 U.S.C. 154(b) by 409 days.

(21) Appl. No.: 10/587,183

(22) PCT Filed: Dec. 13, 2005

(86) PCT No.: PCT/JP2005/022835

§ 371 (c)(1),
(2), (4) Date: Jul. 25, 2006

(87) PCT Pub. No.: WO2006/064785

PCT Pub. Date: Jun. 22, 2006

(65) Prior Publication Data

US 2007/0173282 A1 Jul. 26, 2007

(30) Foreign Application Priority Data

Dec. 13, 2004 (JP) .............................. 2004-359418

(51) Int. Cl.
*H04B 1/00* (2006.01)
*H04M 1/00* (2006.01)
(52) U.S. Cl. ..................... 455/296; 455/552.1; 455/283; 455/284
(58) Field of Classification Search .............. 455/296, 455/303–305, 280, 283–285, 295, 552.1, 455/553.1, 570, 90.2, 114.2
See application file for complete search history.

(56) References Cited

U.S. PATENT DOCUMENTS

| | | | | |
|---|---|---|---|---|
| 5,691,978 A | * | 11/1997 | Kenworthy | 370/278 |
| 5,771,440 A | * | 6/1998 | Sukhu et al. | 455/63.1 |
| 5,860,057 A | * | 1/1999 | Ishida et al. | 455/12.1 |
| 6,526,264 B2 | * | 2/2003 | Sugar et al. | 455/84 |
| 6,704,349 B1 | * | 3/2004 | Masenten | 375/219 |
| 6,771,931 B2 | * | 8/2004 | Waltho | 455/24 |
| 6,961,019 B1 | * | 11/2005 | McConnell et al. | 342/357.1 |
| 6,996,164 B1 | * | 2/2006 | Blount et al. | 375/219 |

(Continued)

FOREIGN PATENT DOCUMENTS

JP 2003-133974 5/2003

(Continued)

*Primary Examiner*—Duc M Nguyen
(74) *Attorney, Agent, or Firm*—McDermott Will & Emery LLP

(57) ABSTRACT

A high frequency receiver capable of stably canceling interference by a transmission signal even if a transmission signal input from a TV antenna is changed. Phase shifter (212) for changing a phase of an interfering distributed transmission signal, detector (216) for detecting a level of a transmission signal included in a receive signal input via an antenna, and level regulator (213) for changing a level of the distributed transmission signal in accordance with this level are provided. A signal input via level regulator (213) and phase shifter (212) and a receive signal are synthesized to be input into mixer (206). Since a transmission signal can be cancelled even if a transmission signal input from an antenna is changed, a high frequency receiver can receive a signal stably when a transmission signal is changed.

30 Claims, 12 Drawing Sheets

U.S. PATENT DOCUMENTS 7,058,368 B2 * 6/2006 Nicholls et al. .......... 455/114.2
7,177,663 B2 * 2/2007 Axness et al. ............ 455/552.1

FOREIGN PATENT DOCUMENTS

| | | |
|---|---|---|
| JP | 2003-168992 | 6/2003 |
| JP | 2003-244015 | 8/2003 |
| JP | 2005-045537 | 2/2005 |

* cited by examiner

FIG. 4

| Receiving channel | Phase shifter control voltage | PLL data | Level regulator |
|---|---|---|---|
| 1 CH | · | · | · |
| 2 CH | · | · | · |
| · · · · · · · | · · · · · · · | · · · · · · · | · · · · · · · |
| CH | · | · | · |
| · · · · | · · · · | · · · · | · · · · |
| CH | · | · | · |

FIG. 9

| Receiving channel | Phase shifter Control voltage | Switch | PLL data | AGC | Amplifier | Amplifier |
|---|---|---|---|---|---|---|
| 1CH | . | . | . | . | . | . |
| 2CH | . | . | . | . | . | . |
| . | . | . | . | . | . | . |
| . | . | . | . | . | . | . |
| . | . | . | . | . | . | . |
| . | . | . | . | . | . | . |
| . | . | . | . | . | . | . |
| . | . | . | . | . | . | . |
| . | . | . | . | . | . | . |
| CH | . | . | . | . | . | . |
| . | . | . | . | . | . | . |
| . | . | . | . | . | . | . |
| . | . | . | . | . | . | . |
| . | . | . | . | . | . | . |
| CH | . | . | . | . | . | . |

F I G. 11
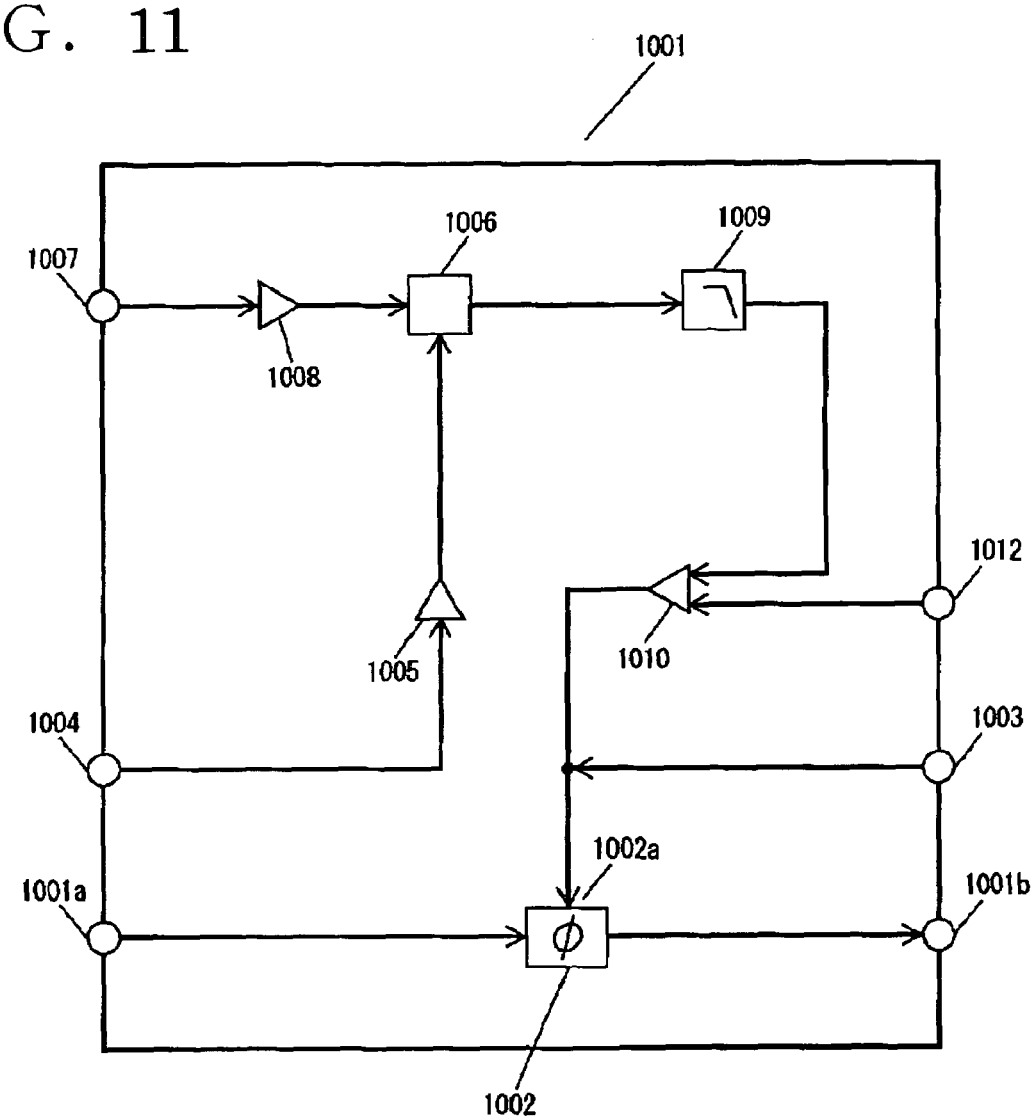

APPARATUS AND METHOD FOR INTERFERENCE CANCELLER IN A HIGH FREQUENCY RECEIVER AND TRANSMITTER

RELATED APPLICATION

This application is a national phase of PCT/JP2005/022835 filed on Dec. 13, 2005, which claims priority from Japanese Application No. 2004-359418 filed on Dec. 13, 2004, the disclosures of which Applications are incorporated by reference herein. The benefit of the filing and priority dates of the International and Japanese Applications is respectfully requested.

TECHNICAL FIELD

The present invention relates to a high frequency receiver for receiving a frequency in the vicinity of a transmission signal from a transmitter, an integrated circuit used therefor, portable equipment using them, a transmitter used therefor and a manufacturing method thereof.

BACKGROUND ART

A conventional high frequency receiver is described with reference to drawings. FIG. 12 is a block diagram showing portable equipment using a conventional high frequency receiving device. A signal input to telephone antenna 1 is input to an input-output terminal of switch 2. Switch 2 switches a signal between transmission and reception. The signal input to telephone antenna 1 is input to telephone receiver 3 via switch 2, and further converted into an intermediate frequency signal to be output from telephone receiver 3.

The intermediate frequency signal output from telephone receiver 3 is input to demodulator circuit 4. The signal demodulated in demodulator circuit 4 undergoes error correction in decoder circuit 5, and then is input to voice output part 6 that is one of voice output devices or image display part 7 that is one of display devices. Voice output part 6 and image display part 7 convert a digital signal decoded in decoder circuit 5 into an analog voice signal and an analog image signal so as to be output as a voice from a speaker and to be displayed as image information on, for example, a liquid crystal display device.

The high-frequency receiver shown in FIG. 12 includes input key 10 and voice input part 11 that is prepared as one of voice input devices. These include a so-called microphone and a circuit for driving this microphone. Output signals from input key 10 and voice input part 11 are input to encoder circuit 12. An analog signal output from voice input part 11 is converted into a digital data signal via encoder circuit 12. Furthermore, based on the instruction from input key 10, encoder circuit 12 generates a digital data signal. A digital data signal output from encoder circuit 12 is input to oscillator 13 and then modulated so as to be generated as a transmission signal. This transmission signal is amplified to a predetermined amount of electric power by power amplifier 14 and input to an input terminal of switch 2. An output signal from power amplifier 14 passes through switch 2 and coupler 32 and is released into the air from antenna 1.

A high frequency signal having a frequency of 470 MHz to 862 MHz is input to TV antenna 21. The high frequency signal coming into TV antenna 21 is input to TV tuner 22. TV tuner 22 includes notch filter 23, local oscillator 24, mixer 25 and demodulator circuit 26. To local oscillator 24, PLL 24A is coupled. To notch filter 23, a high frequency signal input to TV antenna 21 is input via coupler 35. Notch filter 23 attenuates a frequency of 880 MHz among high frequency signals. An output signal from notch filter 23 is input to a first input terminal of mixer 25. To a second input terminal of mixer 25, an output signal from local oscillator 24 is input.

An output signal from demodulator circuit 26 is input to decoder circuit 27. Decoder circuit 27 corrects error of a demodulated television broadcasting signal. The output signal from decoder circuit 27 is input to voice output part 6 and image display part 7, respectively.

In such portable equipment, the difference between a frequency of a transmission signal from a transmitter and the upper bound frequency of a receive frequency band of TV tuner 22 is about 18 MHz, which is relatively narrow. Notch filter 23 allows 862 MHz that is the upper bound frequency of a receive frequency band of TV tuner 22 to pass. Furthermore, since a transmission signal is such an extremely high level as about +33 dBm, a frequency of 880 MHz, that is, the frequency of this transmission signal cannot be attenuated sufficiently by notch filter 23.

Therefore, between antenna 21 and TV tuner 22, interference removing device 31 is coupled so that a transmission signal of a transmitter input via the antenna is not input to mixer 25.

Interference removing device 31 includes coupler (directional coupler) 32, variable attenuator 33, variable phase shifter 34, coupler (directional coupler) 35 and controller 36. Coupler 32 is coupled between telephone antenna 1 and switch 2, distributes a transmission signal and inputs the distributed signal into variable attenuator 33. An output terminal of coupler 32 is coupled to variable attenuator 33. Variable attenuator 33 is allowed to change the attenuation amount based on an instruction from controller 36. An output terminal of variable attenuator 33 is coupled to variable phase shifter 34. To variable phase shifter 34, an output signal taken out of variable attenuator 33 is input. Variable phase shifter 34 changes the phase of the output signal from variable attenuator 33 based on the instruction from controller 36.

Coupler 35 is coupled between TV antenna 21 and notch filter 23. Furthermore, to coupler 35, an output signal from variable phase shifter 34 is input. Then, in coupler 35, an output signal from variable phase shifter 34 and a high frequency signal input to TV antenna 21 are synthesized.

Between the input of controller 36 and the output from decoder circuit 27, error rate determination device 37 is coupled. Error rate determination device 37 determines the error rate in decoder circuit 27. When the error rate is beyond a predetermined rate, error rate determination device 37 sends out a signal having information indicating that the error rate deviates from a predetermined range to controller 36. When controller 36 receives the signal from error rate determination device 37, it controls variable attenuator 33 and variable phase shifter 34.

Variable attenuator 33 and variable phase shifter 34 cooperatively allow the phase of the transmission signal and the phase of transmission signal that is released from telephone antenna 21 and is input via TV antenna 21 to be reversed to each other at about 180°. By synthesizing these transmission signals by coupler 35, a transmission signal entering a TV tuner from telephone antenna 1 via TV antenna 21 is cancelled to remove the interference by the transmission signal.

As information on prior art document relating to the invention of this application, for example, Japanese Patent Unexamined Publication No. 2000-156657 is known.

However, in such a conventional high frequency receiver, variable attenuator 33 and variable phase shifter 34 is controlled based on the error rate of the signal in decoder circuit 27 determined by error rate determination device 37. However, it takes a relatively long time to carry out demodulation in demodulator circuit 26, error correction in decoder circuit 27 and detection of error rate in device 37. In particular, in order to determine the error rate, it is necessary that data of 104 bits or more are determined. This determination of this error rate needs, for example, a time of one second or more. Therefore, with respect to the phase change of a transmission signal input from TV antenna 21 or amplitude change, a variable attenuator controlled by controller 36 or respond to a variable phase shifter are delayed. As a result, rapid change in the phase or amplitude of the transmission signal cannot be followed, so that interference by the transmission signal cannot be cancelled.

SUMMARY OF THE INVENTION

The present invention addresses the problems discussed above, and aims to provide a high frequency receiver capable of stably canceling interference by a transmission signal even if a transmission signal input from a TV antenna is changed.

The high frequency receiver of the present invention includes a phase shifter for changing a phase of a distributed transmission signal that is interfering in the high frequency receiving device, and a detector for detecting the level of a transmission signal included in a receive signal input via an antenna. Furthermore, a level regulator for changing the level of the distributed transmission signal in accordance with the level of the transmission signal is included. Signals input via the level regulator and the phase shifter are synthesized so as to be input to a mixer.

The high frequency receiver of the present invention includes a distributed transmission signal input terminal to which a distributed transmission signal is input. The distributed transmission signal is included at least in a transmission signal and is interfering in a high frequency receiving device. Furthermore, the high frequency receiver includes a phase shifter to which a distributed transmission signal is input and which changes a phase of the distributed transmission signal, and a detector for detecting the level of a transmission signal included in a receive signal input via an antenna. Furthermore, the high frequency receiver includes a level regulator having a first terminal to which the output from the detector is coupled and a second input terminal to which the distributed transmission signal is coupled. The level regulator changes the level of the distributed transmission signal in accordance with the output signal from the detector. Furthermore, a signal input via the level regulator and the phase shifter and a receive signal are synthesized so as to be input to a mixer.

Thus, even if the transmission signal input from the antenna is changed, the transmission signal can be cancelled. Consequently, it is possible to provide a high frequency receiver capable of stably receiving the transmission signal even if it is changed, and the like.

Furthermore, since a signal input to the input terminal is distributed so as to control a level regulator, it is possible to follow the change of the amplitude rapidly. Therefore, the interference due to a transmission signal can be rapidly removed and improved. Furthermore, a noise signal of an oscillator included in the transmission signal is input to a distributed transmission signal input terminal. Even if the frequency of the noise component is a frequency within the receive frequency band, a signal of the noise component can be cancelled.

BRIEF DESCRIPTION OF THE DRAWINGS

FIG. 4 is a view showing a memory table of a receiving channel and a control signal in accordance with the second exemplary embodiment of the present invention.

FIG. 9 is a view showing a memory table of a receiving channel and a control signal in accordance with the fourth exemplary embodiment of the present invention.

FIG. 11 is a block diagram showing phase shifter in accordance with a sixth exemplary embodiment of the present invention.

Figure 1:
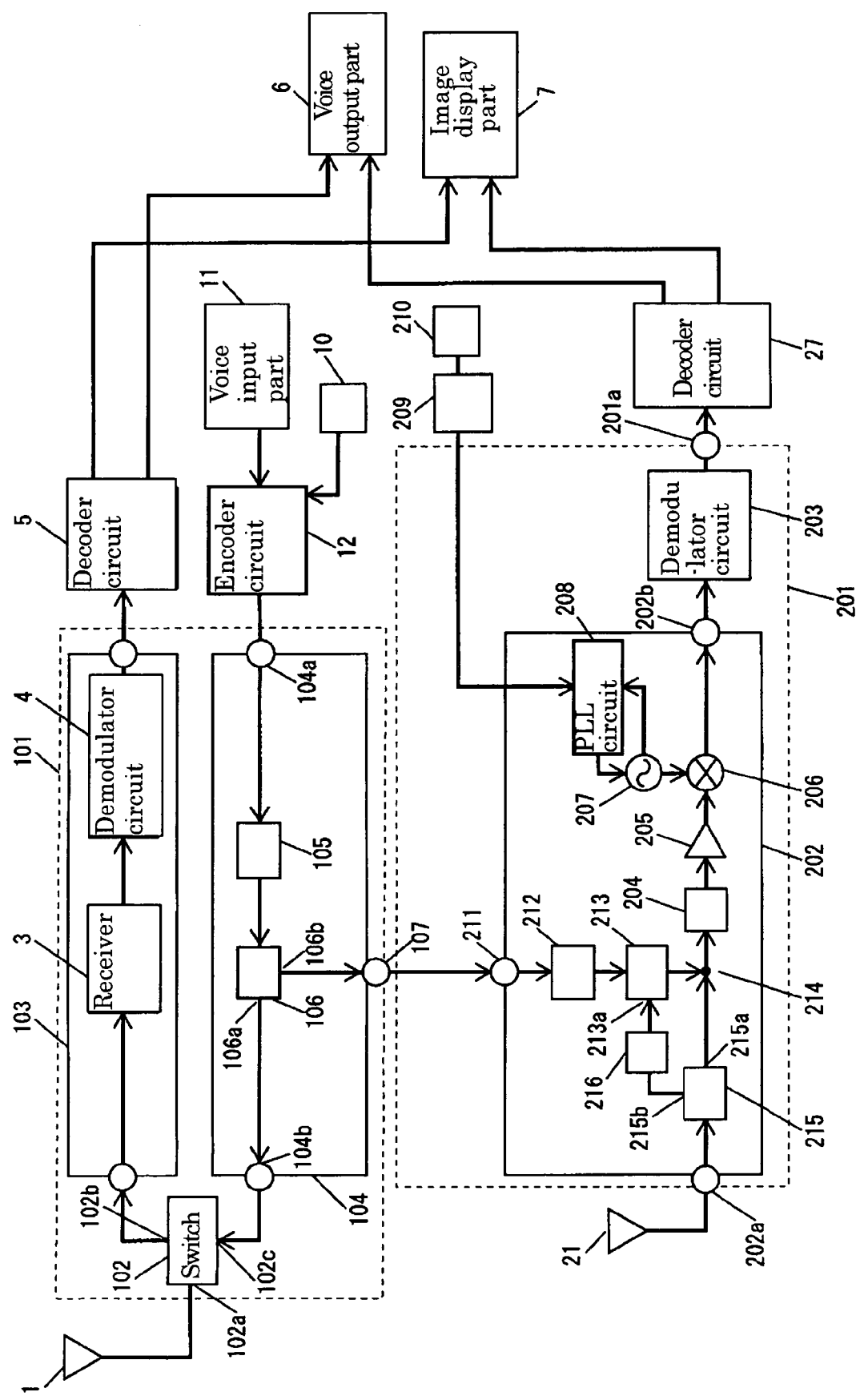
FIG. 1 is a block diagram showing portable equipment in accordance with a first exemplary embodiment of the present invention.

| REFERENCE MARKS IN THE DRAWINGS | |
|---|---|
| 1, 21 | antenna |
| 3 | receiver |
| 4, 203 | demodulator circuit |
| 5, 27 | decoder circuit |
| 6 | voice output part |
| 7 | image display part |
| 10, 210 | input key |
| 11 | voice input part |
| 12 | encoder circuit |
| 101 | telephone part |
| 102 | switch |
| 103 | receiving part |
| 104 | receiver |
| 105 | transmission signal generation part |
| 106, 215 | coupler (directional coupler) |
| 107 | distributed transmission signal output terminal (output terminal) |
| 201 | high frequency receiver |
| 202 | TV tuner |
| 201a | output terminal |
| 202a | input terminal |
| 205 | high-frequency amplifier |
| 206 | mixer |
| 207 | local oscillator |
| 208 | PLL circuit |
| 209 | control circuit |
| 211 | distributed transmission signal input terminal |

-continued

REFERENCE MARKS IN THE DRAWINGS

| | |
|---|---|
| 212 | phase shifter |
| 213 | level regulator |
| 214 | synthesizing part |
| 216 | detector |

DETAILED DESCRIPTION OF THE PREFERRED EMBODIMENTS

First Exemplary Embodiment

Figure 12:
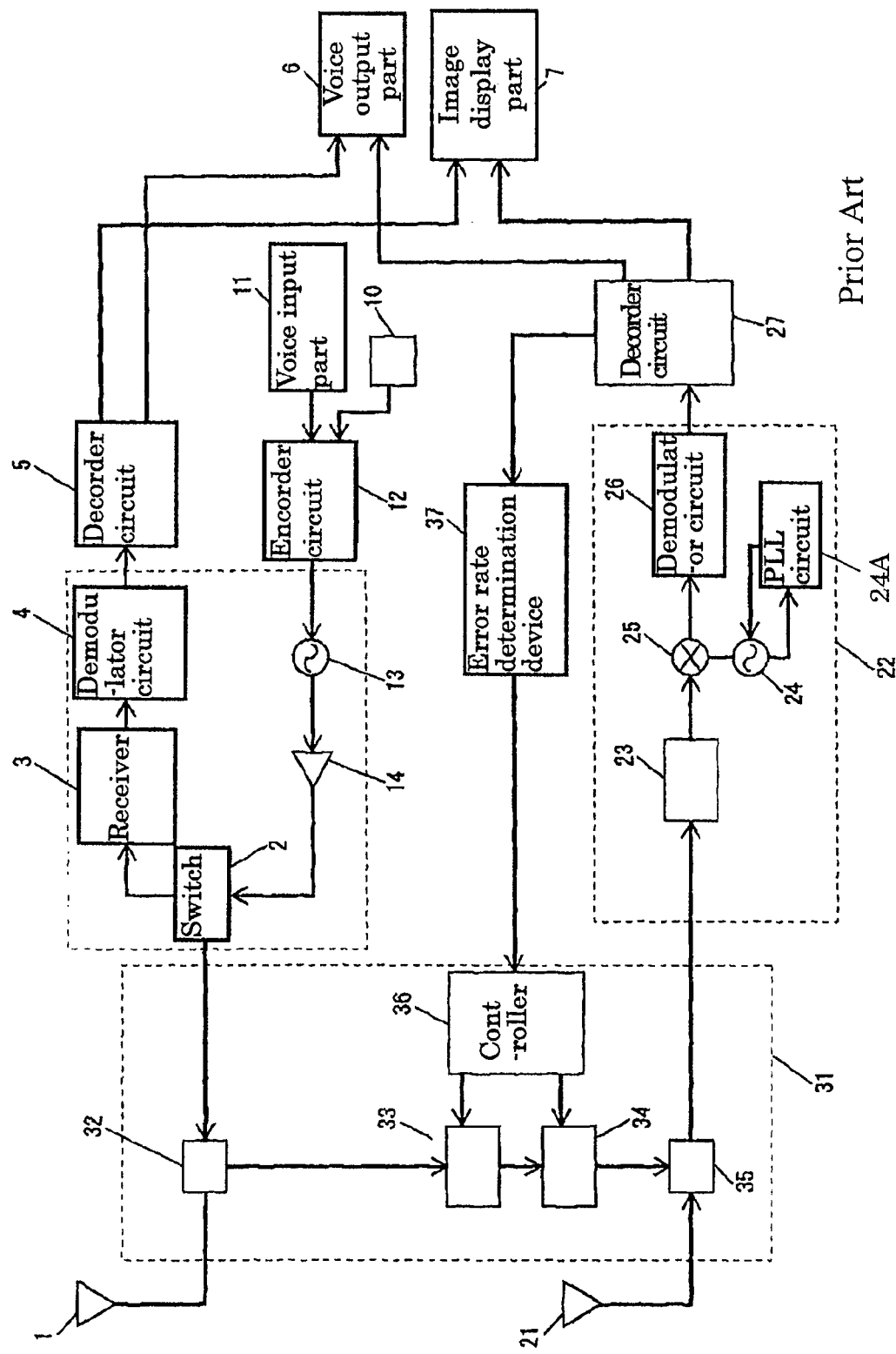
FIG. 12 is a block diagram showing a conventional portable equipment.

Hereinafter, a first exemplary embodiment is described with reference to drawings. FIG. 1 is a block diagram showing portable equipment in accordance with the first exemplary embodiment. The same references are given to the same elements as those described in FIG. 12 used in "Background Art" and description therefor is simplified.

To antenna 1 used as one of transmitting antennas, telephone part 101 is coupled. Telephone part 101 is prepared for transmitting and receiving a GSM mode telephone signal having a frequency of about 880 MHz. Furthermore, telephone part 101 includes antenna switch 102, receiving part 103 and transmitter 104. Antenna 1 is used for both transmitting and receiving signals.

To input-output terminal 102a of antenna switch 102, antenna 1 is coupled. To output terminal 102b, telephone receiver 3 is coupled. Antenna switch 102 switches a signal between transmission and reception. At the time of reception, a signal received by antenna 1 is output to telephone receiver 3.

Next, the frequency of the signal received by telephone receiver 3 is converted. An output signal from telephone receiver 3 is input to demodulator circuit 4. Demodulator circuit 4 modulates a telephone signal. An output from demodulator circuit 4 is input to voice output part 6 via decoder circuit 5 and output from a speaker of voice output part 6 as voice.

Next, transmitter 104 is described. A voice signal input via a microphone (not shown) provided in voice input part 11 is converted into a digital data signal digitized and encoded by encoder circuit 12 and the digital data signal is input to input terminal 104a of transmitter 104.

Transmission signal generation part 105 oscillates a carrier wave having a frequency of about 880 MHz. Furthermore, this carrier wave is directly modulated by a digital data signal to generate a transmission signal. An output signal from part 105 is input to coupler (directional coupler) 106 used as one of distributors. First output terminal 106a of coupler 106 is coupled to output terminal 104b of transmitter 104. Output terminal 104b is prepared as one of the transmission signal output terminals.

Output terminal 104b is coupled to input terminal 102c of switch 102 of antenna. A transmission signal generated at transmission signal generation part 105 is released into the air from antenna 1 via antenna switch 102.

Output terminal distributed transmission signal output terminal (output terminal) 107 is prepared as one of the distributed transmission signal output terminals. Output terminal 107 is coupled to the second output terminal 106b of coupler (directional coupler) 106. From output terminal 106b, a distributed transmission signal distributed from a transmission signal generated at transmission signal generation part 105 is output. The signal level of the distributed transmission signal output from output terminal 107 is made to be about 10% of the signal level of the transmission signal generated at the transmission signal generation part.

This is because the transmission power released from antenna 1 is made to be as large as possible. Thus, it is possible to reduce the loss of distributed transmission signal by coupler (directional coupler) 106. This is important for portable equipment. The power consumption can be suppressed and the lifetime of transmitter 104 can be increased.

To receiver 201 used as one of the high frequency receivers, an output from antenna 21 is coupled. High frequency receiver 201 receives a digital-modulated high frequency signal. High frequency receiver 201 includes TV tuner 202 to which a signal input to antenna 21 is input, demodulator circuit 203 to which an output terminal of TV tuner 202 is coupled, and output terminal 201a to which an output terminal of demodulator circuit 203 is coupled. The demodulation signal input to output terminal 201a is input to voice output part 6 and image display part 7 via decoder circuit 27.

The receive frequency band of TV tuner 202 is in the range of 470 MHz to 862 MHz as an example of a frequency band of a receive signal. Digital-modulated television broadcasting signal (used as one example of the receive signals) in this receive frequency band is input to input terminal 202a of TV tuner 202.

To filter 204, a signal input to input terminal 202a is input. Filter 204 attenuates a signal in a band other than the receive frequency band. To high-frequency amplifier 205, a television broadcasting signal applied to input terminal 202a is input. High-frequency amplifier 205 amplifies the television broadcasting signal to a predetermined level of signal. High-frequency amplifier 205 carries out amplification of about 20 dB.

An output signal from high-frequency amplifier 205 and an output signal from local oscillator 207 are input to the first input terminal and the second input terminal of mixer 206, respectively. Mixer 206 converts the television broadcasting signal into a signal having a predetermined frequency (hereinafter, referred to as "intermediate frequency"), and the signal is input to demodulator circuit 203 via output terminal 202b of TV tuner 202. The intermediate frequency of the signal output from mixer 206 is set to 36 MHz.

PLL circuit 208 is loop-coupled to local oscillator 207. PLL circuit 208 controls the frequency of local oscillator 207 and controls the oscillation frequency of local oscillator 207 to become a frequency in accordance with received channel data to be input from control circuit 209. To control circuit 209, input key 210 is coupled. Control circuit 209 generates receiving channel data in accordance with information, which is input from input key 210, on a channel that is desired to be received. In the first exemplary embodiment, control circuit 209 is provided outside of high frequency receiver 201, however, it may be provided inside high frequency receiver 201 or TV tuner 202.

Output terminal 107 of transmitter 104 is coupled to distributed transmission signal input terminal 211 of TV tuner 202 via, for example, a pattern of a printed circuit board provided inside the housing of the portable equipment. To input terminal 211, a distributed transmission signal obtained by distributing a transmission signal from transmission signal generation part 105 is input.

To phase shifter 212, the distributed transmission signal input to input terminal 211 is input. Phase shifter 212 changes the phase of the distributed transmission signal by only a predetermined angle. Level regulator 213 is coupled to an output terminal of phase shifter 212. Level regulator 213 changes the signal level of the distributed transmission signal and can change the signal level of the distributed transmission signal in accordance with the voltage input to level control terminal 213a.

Then, an output signal from level regulator 213 and a high frequency signal input to input terminal 202a are synthesized in synthesizing part 214 and the synthesized signal is input to filter 204. Between input terminal 202a and synthesizing part 214, coupler (directional coupler) 215 is coupled. The first output terminal 215a of directional coupler 215 is coupled to synthesizing part 214. On the other hand, between second output terminal 215b of coupler 215 and level control terminal 213a, detector 216 is coupled. To detector 216, a distributed receive signal obtained by distributing a high frequency signal input to input terminal 202a is input. Detector 216 outputs a DC voltage in accordance with the level of this distributed receive signal. Level regulator 213 changes the level of the distributed transmission signal based on the DC voltage in accordance with the distributed receive signal.

Telephone receiver 3, transmitter 104, high frequency receiver 201, antenna switch 102, demodulator circuit 4, decoder circuit 5, demodulator circuit 203, voice input part 11, input keys 10 and 210, encoder circuit 12" and control circuit 209, and the like, are contained in one housing so as to form a portable telephone having a receiver for receiving TV broadcasting. Note here that the portable telephone is shown as one example of portable equipment.

Next, an operation of portable equipment in accordance with the first exemplary embodiment is described. Firstly, transmitting and receiving operation is described. Based on a digital data signal obtained by encoding a voice signal of voice input part 11 or an instruction from input key 10, a digital data signal generated by encoder circuit 12 is input to encoder circuit 105 via terminal 104a. In transmission signal generation part 105, a frequency signal of about 880 MHz is directly modulated by the digital data signal and a transmission signal having a carrier wave frequency of about 880 MHz is generated. Then, this transmission signal is released into the air from transmitting antenna 1 via antenna switch 102.

Next, an operation of receiving television broadcasting is described. A television broadcasting signal having a frequency of about 470 to 862 MHz is input to antenna 21. This input television broadcasting signal is input to filter 204. Filter 204 allows a frequency of the receive frequency band to pass and attenuates a frequency of other than the receive frequency band. Thus, a television broadcasting signal, in which a signal out of the receive frequency band is suppressed, is amplified by high-frequency amplifier 205 and converted into an intermediate frequency of 36 MHz by mixer 206. Then, the signal having an intermediate frequency is processed by demodulator circuit 203 and decoder circuit 27, and input to voice output part 6 or image display part 7 so as to be output as voice or image.

In this case, in order to reduce the power consumption of portable equipment, power supplies of transmitter 104, phase shifter 212, level regulator 213 and detector 216, and the like, are turned off.

Next, a case where transmitter 104 is operated while television broadcasting is viewed is described. The case includes, for example, a case where a user wants to speak another person on the phone while the user views television broadcasting, a case where a user transmits a digital data signal while the user view television broadcasting, or a case where a user talks on the phone while the user records television broadcasting, and the like. That is to say, in a state of these cases, transmitter 104 and TV tuner 202 are operated concurrently.

Figure 2:
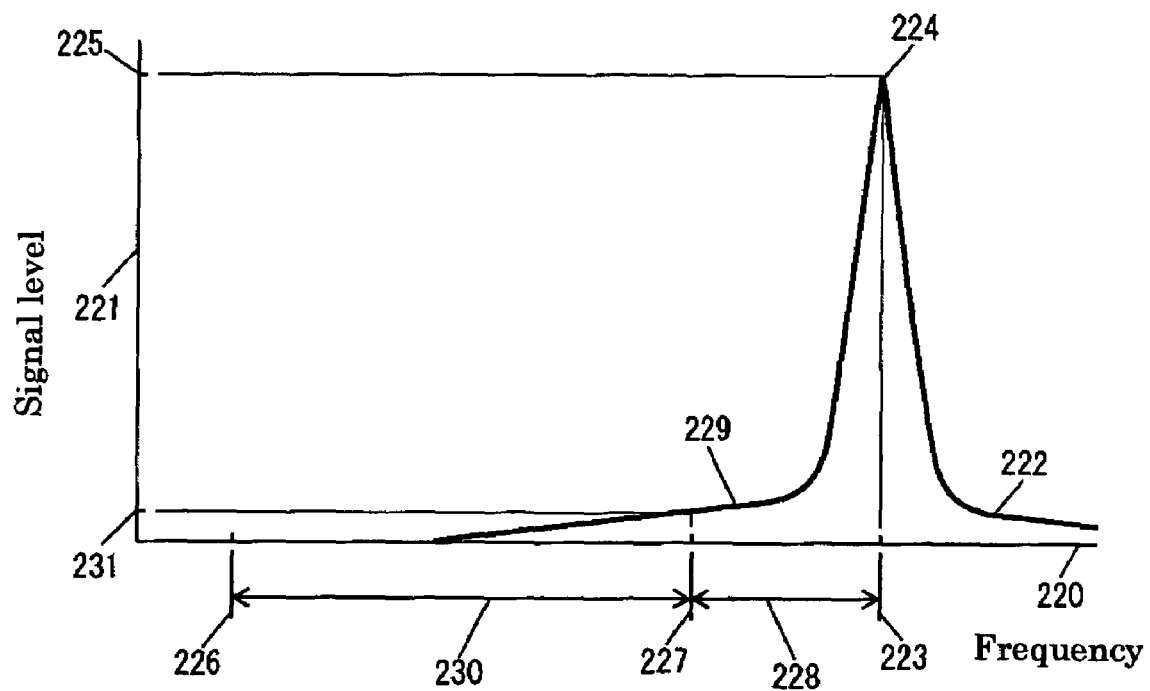
FIG. 2 is a graph showing characteristics of a transmission signal at a transmission signal generation part in accordance with the first exemplary embodiment of the present invention.

Firstly, in the first exemplary embodiment, a transmission signal released from transmitting antenna 1 is described with reference to FIG. 2. FIG. 2 is a graph showing characteristics of the frequency of oscillation signal in transmission signal generation part 105 in accordance with the first exemplary embodiment. In FIG. 2, abscissa 220 indicates a frequency and ordinate 221 indicates a signal level, respectively. Transmission signal 222 is generated by transmission signal generation part 105. In FIG. 2, frequency 223 is a frequency corresponding to carrier wave 224 of the transmission signal. The frequency thereof is about 880 MHz. Signal level 225 of carrier wave 224 of transmitter 104 is required to be an extremely large signal level in order to transmit transmission signal 222 to distant base station. Therefore, the carrier wave signal level is set to +33 dBm.

Frequency 226 is the lowest frequency in the frequencies high frequency receiver 201 receives. The frequency corresponds to, for example, a channel end at the side of low frequency of 21 CH. On the other hand, frequency 227 is the highest frequency in the frequencies high frequency receiver 201 receives. The frequency corresponds to, for example, a channel end at the side of high frequency of 69 CH. Frequency difference 228 between frequency 227 and frequency 223 is about 18 MHz, which is extremely narrow.

Furthermore, transmission signal 222 generated by transmission signal generation part 105 includes noise component 229. That is to say, a noise component of transmission signal 222 is included in receive frequency band 230 of high frequency receiver 201. Level 231 of noise component 229 in the frequency 227 is about −60.2 dBm based on the receiving channel band width.

Herein, when transmitter 104 and high frequency receiver 201 are operated concurrently, transmission signal 222 is released from transmitting antenna 1 and input to high frequency receiver 201 via antenna 21. In general, the isolation that can be secured between transmitting antenna 1 and antenna 21 is only about 10 dB. Therefore, the level of transmission signal 222 input to antenna 21 is about +23 dBm. On the other hand, in a place that is distant from the broadcasting station and has a weak electric field, the signal level of the television broadcasting signal to be input to antenna 21 is relatively small level such as about −96.4 dBm. That is to say, the signal level of the transmission signal may be larger than the television broadcasting signal to be input to antenna 21. In such a place with a weak electric field, when TV tuner 202 and transmitter 104 are operated concurrently, noise component 229 of the transmission signal becomes interfering, so that portable equipment cannot reproduce television broadcasting.

Furthermore, since filter 204 has to allow receive frequency band 230 to pass, a filter having a frequency of up to 227 and small passing loss 1 is used as filter 204. Thus, the attenuation amount in the frequency 223 of carrier wave 224 that is only about 18 MHz distant from frequency 227 is small. In such a case, even when, for example, a notch filter is used, the attenuation amount that can be obtained at frequency 223 is only about 40 dB. Therefore, the signal level of carrier wave 224 is still large even when the signal passes through filter 204. When a signal having such a large signal level is input to high-frequency amplifier 205 or mixer 206, high-frequency amplifier 205 or mixer 206 generates a distortion signal.

Then, transmission signal 222 is input to high frequency receiver 201 in portable equipment and be synthesized with a receive signal input from antenna 21, thereby canceling a transmission signal included in the receive signal. Specifically, phase shifter 212 delays the phase of a distributed transmission signal distributed from transmission signal 222, so that the phase is allowed to be different by 180° from a phase of the transmission signal input from antenna 21. Furthermore, in order to make the signal level (amplitude) of these signals substantially the same as each other, the level of the distributed transmission signal is adjusted by using level regulator 213. Then, by synthesizing the signal passing through phase shifter 212 and level regulator 213 with the receive signal, an interfering transmission signal is cancelled. In this way, since the carrier wave of the transmission signal and a noise component are cancelled, high frequency receiver 201 is subjected to less interference by transmitter 104.

Detector 216 detects a total electric power of the signals distributed by coupler (directional coupler) 215 and inputs a voltage in accordance with the value of electric power to level regulator 213. The level of carrier wave 224 input to input terminal 202a is about +23 dBm. On the other hand, the level of the television broadcasting signal input to input terminal 202a is about −28 dBm in a place that is near the broadcasting station and has a strong electric field. Such a level is sufficiently larger as compared with the level of the television broadcasting signal. Therefore, there is no substantial problem in that a total sum of electric power of the signals distributed by coupler 215 is used as a signal level of the transmission signal input to the input terminal.

In the configuration mentioned above, detector 216 detects a signal level of the transmission signal input to input terminal 202a and controls level regulator 213. Thus, detector 216 changes the level (amplitude) of distributed transmission signal input to level regulator 213, and allows the signal level of the distributed transmission signal to match the signal level of transmission signal input from input terminal 202a. That is to say, by adjusting the level of the distributed transmission signal by the use of the signal distributed from high frequency signal input to input terminal 202a, the level of the distributed transmission signal can be changed rapidly. Thus, high frequency receiver 201 can stably cancel the interference by the transmission signal even if the amplitude of the transmission signal input from antenna 21 is changed. Therefore, it is possible to provide a portable telephone in which interference hardly occurs even when transmission and TV broadcasting reception are carried out concurrently. Furthermore, since following the change of the amplitude becomes fast, interference can be removed rapidly.

Furthermore, since noise component 229 included in the transmission signal is input to distributed transmission signal input terminal 211, even when the frequency of noise component 229 is a frequency within receive frequency band 230 of the high frequency receiver, signals of noise component 229 can be cancelled.

In addition, since the detector in accordance with the first exemplary embodiment detects the level of the transmission signal input to input terminal 202a based on the total sum of electric power, a filter, etc. for extracting a transmission signal is not required to be additionally provided. Thus, a portable telephone can be provided at low cost. Furthermore, since the configuration can be also simplified, small size and light weight of the portable equipment can be realized.

Furthermore, output terminal 107 and distributed transmission signal input terminal 211 are contained in a housing of the portable equipment and coupled to each other via wiring on a printed circuit board on which transmitter 104 and high frequency receiver 201 of output terminal 107 and input terminal 211, and the like, are mounted. At this time, transmitter 104 and high frequency receiver 201 are preferably apart from each other as distant as possible in order to prevent signals of the high frequency circuit from being interfered with each other.

Note here that a wiring connecting between output terminal 107 and distributed transmission signal input terminal 211 is desirably as short as possible. This is because long wiring may delay a distributed transmission signal from a predetermined phase due to the capacity component of the wiring itself.

Second Exemplary Embodiment

Figure 3:
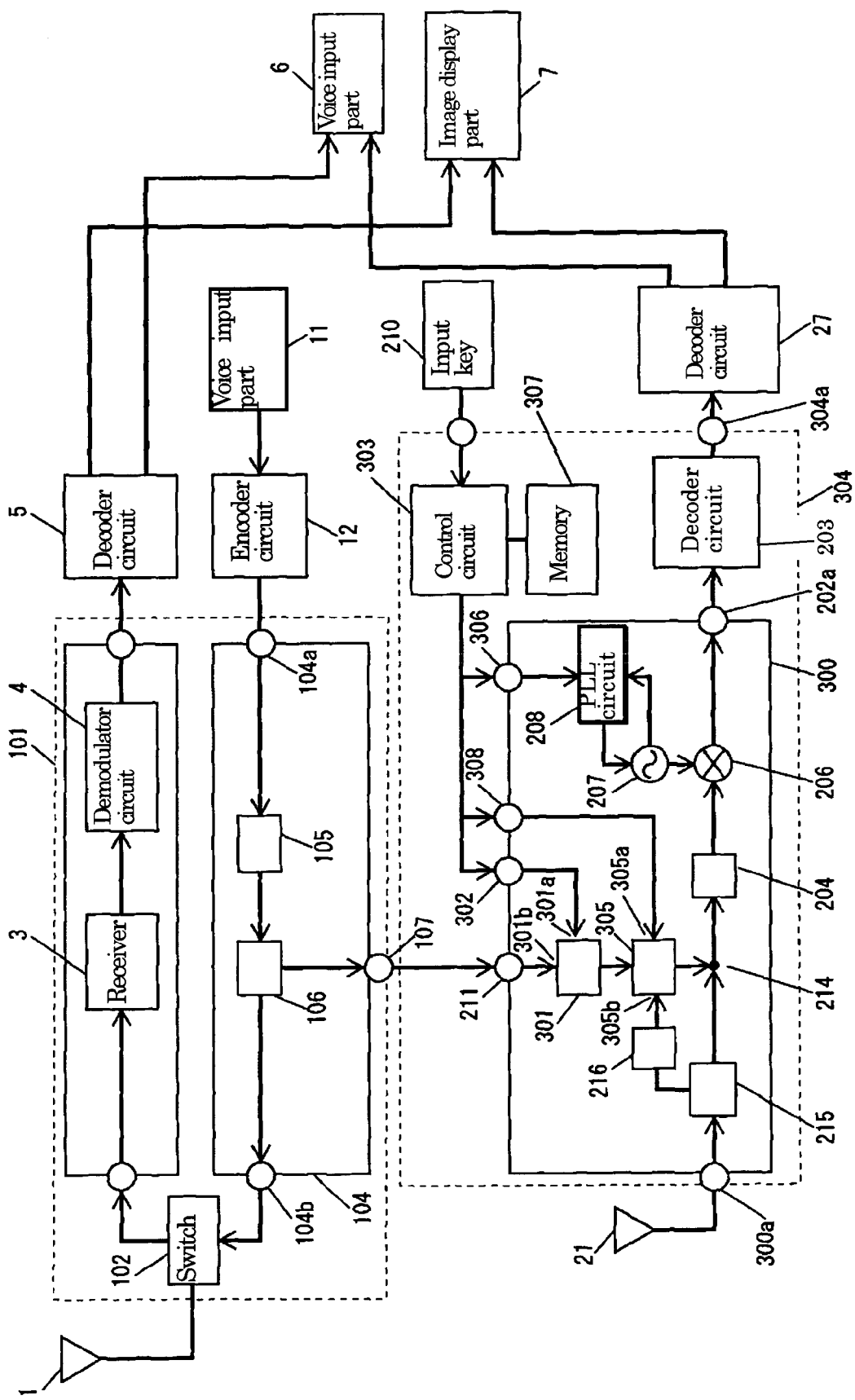
FIG. 3 is a block diagram showing portable equipment in accordance with a second exemplary embodiment of the present invention.

Next, a second exemplary embodiment is described with reference to FIG. 3. FIG. 3 is a block diagram showing portable equipment. The same reference numerals are given to the elements as those in FIG. 1 and description therefor is simplified.

In TV tuner 300 in accordance with the second exemplary embodiment, instead of phase shifter 212 in accordance with the first exemplary embodiment, phase shifter 301 capable of changing phases is used. Phase shifter 301 changes a phase of a distributed transmission signal input to input terminal 301b in accordance with a voltage input to phase control terminal 301a.

Phase control terminal 301a is coupled to output terminal of control circuit 303 via control terminal 302 of TV tuner 300. Control circuit 303 is used as one of the phase controllers. Control circuit 303 is disposed in high frequency receiver 304 and coupled to control terminal 305a of level regulator 305 via control terminal 308 of TV tuner 300. To level control terminal 305b of level regulator 305, an output terminal of detector 216 is coupled.

An output terminal of control circuit 303 is coupled to PLL circuit 208 via data terminal 306 of TV tuner 300. To control circuit 303, memory 307 is coupled. Memory 307 stores table 351 as shown in FIG. 4. Table 351 stores phase shifter control voltage 353 in accordance with receiving channel 352, PLL data 354 and control voltage 355 of a level regulator. Thus, control circuit 303 controls phase shifter 301 and level regulator 305 based on table 351. In a channel that is desired to be received, which is input from input key 210, phase shifter 301 and level regulator 305 are controlled so that a phase change amount and a level amount become appropriate values.

From the above-mentioned configuration, since control circuit 303 can control phase shifter 301 and level regulator 305 in accordance with the receiving channel, variation of the phase change of phase shifter 301 with respect to frequency or variation in the level of level regulator 305 can be also corrected. Therefore, a noise component signal included in the receive signal input to input terminal 300a can be cancelled accurately without depending on the receiving channel. Therefore, high frequency receiver 304 is not likely to be interfered with a transmission signal of transmitter 104, and thus television broadcasting can be received stably.

Thus, filter 204 having a small attenuation amount at frequency 223 of carrier wave 224 can be used. Thus, it is not necessary to prepare an expensive and large filter such as a SAW filter. Low cost and small size of high frequency receiver 304 can be realized. Then, the use of such a high frequency receiver 304 for portable equipment, and the like, allows portable equipment with small size to be provided at low cost.

In the second exemplary embodiment, phase shifter 301 and level regulator 305 are coupled in this order. However, the coupling order may be opposite to this order and in such a case the same advantage can be realized.

Furthermore, detector 216 outputs voltage 0V with respect to signals below the level of the signals input to detector 216 under a strong electric field of the television broadcasting. Furthermore, between control terminal 302 and level regulator 305, switch (not shown) is coupled. This switch is turned ON/OFF by a voltage from detector 216. Thus, the level regulator is not allowed to be operated in a state in which a transmission signal is not detected, so that it can reduce power consumption.

Next, a method of manufacturing high frequency receiver 304 and portable equipment in accordance with the second exemplary embodiment is described. Firstly, a method of manufacturing high frequency receiver 304 is described. Signals corresponding to distributed transmission signals distributed from transmission signal generation part 105 of a transmitter are firstly input to distributed transmission signal input terminal 211 as a pseudo distributed transmission signal. On the other hand, a high frequency signal, in which level is changed by a predetermined amount and which includes a pseudo transmission signal whose pseudo phase is delayed and a pseudo television broadcasting signal, is input to input terminal 300*a*.

Herein, the phase and level are changed because the loss in the signal level is generated and the phase delay is caused until a transmission signal generated by transmission signal generation part 105 is input to input terminal 300*a* via transmitting antennas 1 and 21. Then, a signal assuming this phase delay and the level change is input to input terminal 300*a*.

In this state, high frequency receiver 304 is operated so as to start receiving. At this time, a signal indicating a manufacture mode is input to control circuit 303. Thus, control circuit 303 changes a voltage input to phase shifter 305 and allows memory 307 to store the voltage output when a bit error rate of signals output from output terminal 304*a* is the most excellent. Note here that a bit error rate is used as one of the factors for evaluating the quality of signals. Then, by repeating this operation by an amount corresponding to the receiving channels, a control voltage corresponding to each receiving channel is stored as a table in memory 307 as shown in Table 1.

TABLE 1

| Receiving channel | Frequency (MHz) | Control voltage |
|---|---|---|
| CH64 | 818 | 1.3 V |
| ... | ... | ... |
| CH69 | 858 | 1.9 V |

However, when the thus manufactured high frequency receiver 304 is incorporated into actual portable equipment, depending on the arrangement of transmitting antennas 1 and 21 in the portable equipment and a circuit configuration of the transmitter, the phase or level may be different from the assumed value. Therefore, in the method of manufacturing portable equipment, the portable equipment is allowed to operate as a manufacturing mode when an instruction code is input to a control circuit (not shown) of the portable equipment in a state in which it can be operated as portable equipment. This manufacturing mode is used for determining whether or not the assumed value at the time of manufacturing high frequency receiver 304 is appropriate.

That is to say, when an instruction code is input, transmitter 104 generates a test transmission signal and inputs it into antenna 1. Furthermore, a distributed transmission signal distributed by coupler 106 is input to a distributed transmission signal output terminal. Furthermore, to antenna 21, a pseudo television broadcasting signal of the level when an electric field is weak is input. Then, high frequency receiver 304 is allowed to actually receive a receiving channel. At this time, in high frequency receiver 304, phase shifter 301 and level controller 305 are operated by a control voltage stored in a memory when the high frequency receiver is manufactured. When the phase or the level meets the set level in a state in which the high frequency receiver is incorporated into portable equipment, a bit error rate shows an excellent value and television broadcasting is received.

However, in a state in which the high frequency receiver is incorporated, when the phase or the level of the transmission signal is different from the assumed one, the bit error rate may deviate from the predetermined range. In such a case, control circuit 303 changes a control voltage input to phase shifter 301 and allows the control voltage showing the best bit error rate to be rewritten in table 351.

Third Exemplary Embodiment

As described in the first exemplary embodiment, a phase shifter changing phases in a broad band generally has a complicated and large configuration and is expensive. Therefore, in equipment such as portable equipment in which portability is particularly preferential, it is difficult to employ such a configuration.

Then, in the third exemplary embodiment, instead of phase shifter 301 (FIG. 3) in accordance with the second exemplary embodiment, a phase shifter is configured by using phase shifter 501 (FIG. 5) capable of changing phases in a narrow frequency band.

Figure 5:
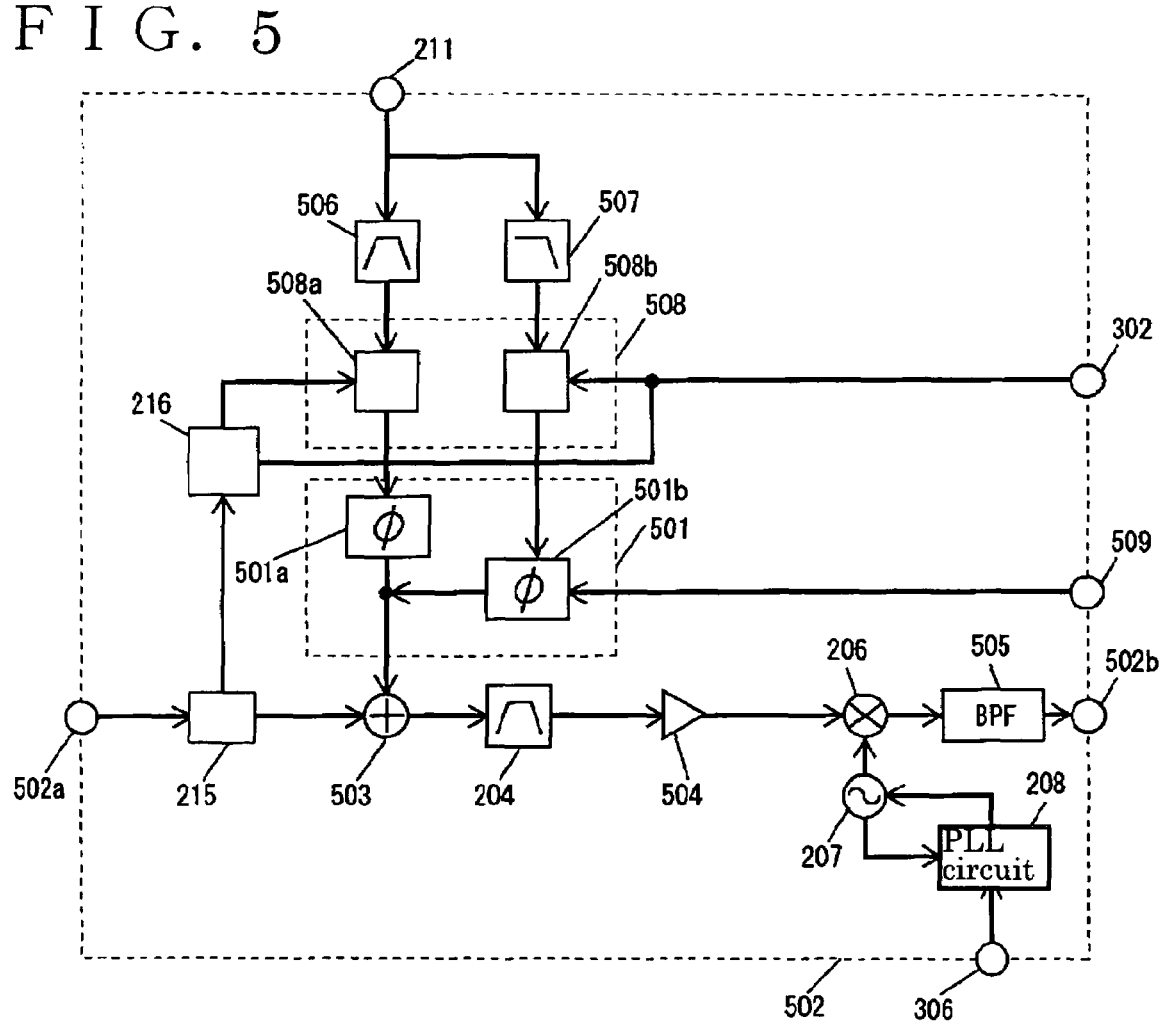
FIG. 5 is a block diagram showing portable equipment in accordance with a third exemplary embodiment of the present invention.

Next, the third exemplary embodiment is described with reference to drawings. FIG. 5 is a block diagram showing a TV tuner. The same reference numerals are given to the same elements in FIG. 3 and the description therefor is simplified.

A receive signal input to input terminal 502*a* is input to a first input terminal of synthesizer 503 via directional coupler 215. An output signal from synthesizer 503 is input to amplifier 504 via filter 204. To the first input terminal of mixer 206, an output signal from amplifier 504 is input. To the second input terminal of mixer 26, an output signal from local oscillator 207 is input. The signals are converted into signals having a predetermined intermediate frequency by mixer 206. Signals of frequency other than the intermediate frequency signal are removed by band-pass filter 505 and output from output terminal 502*b*.

A distributed transmission signal input to distributed transmission signal input terminal 211 is input to band-pass filter 506 and low-pass filter 507. Band-pass filter 506 allows frequency 223 of carrier wave 224 to pass. Signals of carrier wave 224 in the distributed transmission signals are output.

Low-pass filter 507 has a band through which receive frequency band 230 can pass and frequency 227 is a cut-off frequency. Thus, low-pass filter 507 outputs noise component 229 in receive frequency band 230.

Level regulator 508 includes carrier wave level regulator 508*a* to which an output signal from band-pass filter 506 is input and noise level regulator 508*b* to which an output of low-pass filter 507 is input. To regulator 508*a* and regulator 508*b*, an output signal from detector 216 is input, respectively. The level of the carrier wave and the noise component signal are adjusted in accordance with the level of the transmission signal detected by detector 216. To regulator 508*b*, a signal of detector 216 and an output signal from control circuit 303 (FIG. 3) are input in state in which the signals are synthesized. Thus, regulator 508*b* corrects the level of noise component 229 in accordance with the receiving channel.

Phase shifter 501 includes fixed phase shifter 501a to which output from carrier wave level regulator 508a is coupled and phase changer 501b to which an output from noise level regulator 508b is coupled. Phase changer 501b is used as one of phase changing parts. Fixed phase shifter 501a changes the phase of carrier wave 224 of 880 MHz and uses a phase shifter by a polyphase filter. Phase changer 501b includes a filter including a variable capacitance diode, and the like. The phase of a noise component in each channel is changed in accordance with the control voltage input to this variable capacitance diode.

Control voltage input from control circuit 303 via control terminal 509 is input to phase changer 501b via control terminal 509. Thus, phase changer 501b can obtain a phase change amount suitable for each channel with respect to a noise component signal. Then, a synthesized signal obtained by synthesizing an output signal from fixed phase shifter 501a and an output signal from phase changer 501b are input to the second input terminal of synthesizer 503. Thereby, the carrier wave input from input terminal 502a and a noise component signal at the receiving channel can be cancelled. Synthesizer 503 synthesizes signals by the use of a coupler (directional coupler).

Figure 6:
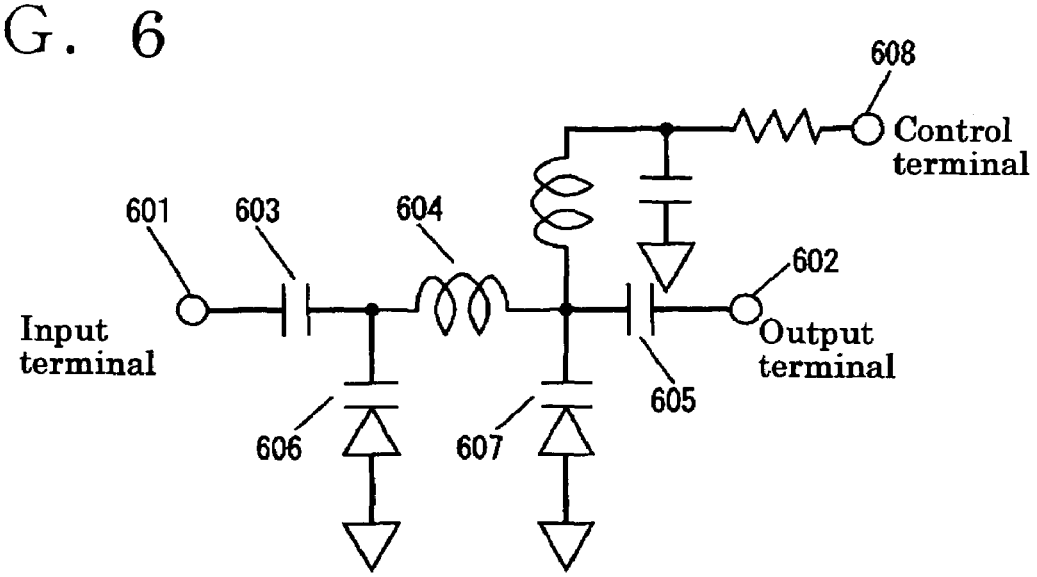
FIG. 6 is a circuit diagram showing a phase changer in accordance with the third exemplary embodiment of the present invention.
Figure 7:
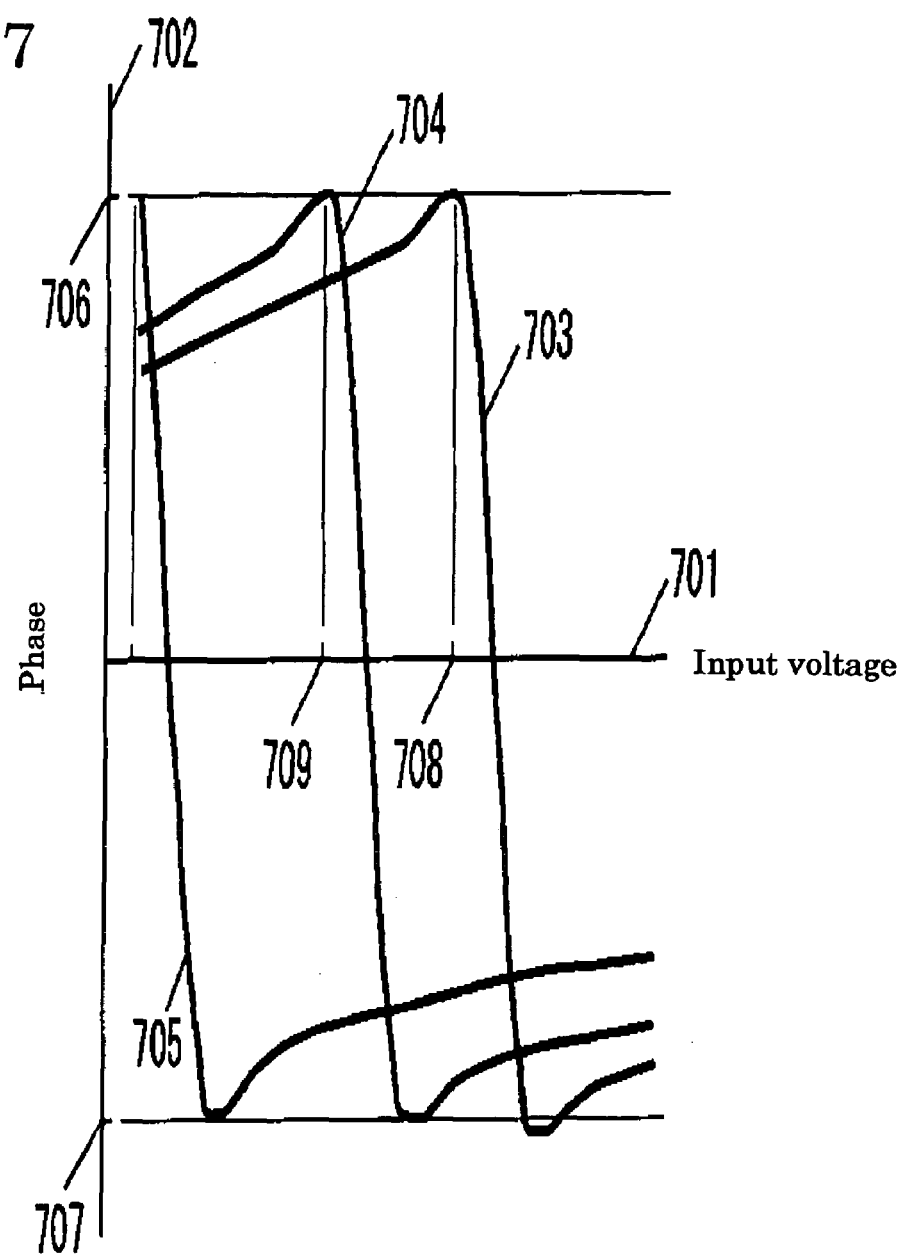
FIG. 7 is a graph showing characteristics of the phase changer.

Next, phase changer 501b in accordance with the third exemplary embodiment is described with reference to FIGS. 6 and 7. FIG. 6 is an equivalent circuit diagram showing a phase changer in accordance with the third exemplary embodiment. FIG. 7 is a graph showing characteristics of the phase changer. In FIG. 6, a signal which has passed through low-pass filter 507 is input to input terminal 601. Between input terminal 601 and output terminal 602, capacitor 603, inductor 604 and capacitor 605 are coupled in series in this order. In addition, to input terminal 601 and output terminal 602 of inductor 604, variable capacitance diodes 606 and 607 are coupled, respectively. The cathode sides of variable capacitance diodes 606 and 607 are coupled to the sides of inductor 604, respectively, and the anode sides are coupled to ground (grounded). The cathode sides of variable capacitance diodes 606 and 607 are coupled to phase control terminal 608.

Next, an operation in which the phase changes in phase changer 501b is described. According to this configuration, in variable capacitance diodes 606 and 607, the capacitance is changed in accordance with the voltage input to phase control terminal 608, and the phase of the noise component signal input to input terminal 601 is changed. Therefore, to phase control terminal 608, a phase control voltage in accordance with the receiving channel from control circuit 303 is input via control terminal 509. Thus, as shown in FIG. 7, it is possible to change the phase into the suitable size in each receiving channel depending on the input voltage.

In FIG. 7, abscissa 701 indicates an input voltage input to phase control terminal 608, and ordinate 702 indicates a phase, respectively. FIG. 7 shows phase characteristic curve 703 at 858 MHz (69 CH), phase characteristic curve 704 at 802 MHz (62 CH), and phase characteristic curve 705 at 698 MHz (49 CH) as typical examples. All of them can be changed from phase 706 to phase 704 by a control voltage to be input. In phase changer 501b, phase 706 is +180° and phase 707 is −180°. Therefore, in the range of this phase change amount, the phase of a noise component signal can be set to a necessary phase amount appropriately.

For example, in order to shift the phase of the noise component signal by 180°, voltage 708 is input for receiving CH 69 (858 MHz), and voltage 709 is input for receiving CH 62 (802 MHz). Note here that the shifting amount of the phase is required to be set so that it is the same amount as the phase difference amount in a standard state between the phase of the transmission signal input via transmitting antenna 1 and the phase of the distributed transmission signal input from the housing.

Then, in the third exemplary embodiment, memory 307 stores a table showing a phase control voltage to be input to phase changer 501b with respect to each receiving channel. Based on the prescribed values stored in this table, the changing amount of the phase of a noise component signal is set in accordance with the receiving channel, individually. Thus, phase changer 501b can cancel a noise component signal with respect to each channel, securely. Memory 307 is coupled to control circuit 303, and the prescribed values stored in memory 307 are supplied to control terminal 608 via control circuit 303.

As mentioned above, in the third exemplary embodiment, a polyphase filter is used for fixed phase shifter 501a, and a filter type phase shifter using a variable capacitance diode is used for phase changer 501b. Furthermore, since control circuit 303 controls phase changer 501b in accordance with the table stored in memory 307, it is not necessary to additionally provide a controlling circuit and the like in a TV tuner. Accordingly, phase shifter 501 can be configured by a simple circuit and controlled. Therefore, a small-sized TV tuner or portable equipment can be realized at low cost.

Phase changer 501b in accordance with the third exemplary embodiment has a form of a low-pass filter in which a cut-off frequency is changed depending on the voltage to be input to variable capacitance diodes 606 and 607. Therefore, in the case where the voltage to be input to variable capacitance diodes 606 and 607 is changed, the level of a noise component signal input to phase changer 501b is changed depending on the channel to be received.

In order to compensate this change, the correction values of noise level regulator 508b with respect to each receiving channel are stored as a table in memory 307. Control circuit 303 outputs a corrected voltage according to this corrected value. Then, noise level regulator 508b is controlled by a signal obtained by synthesizing an output signal from detector 216 and the corrected voltage. Thus, since the level of a noise component signal is corrected at the level suitable for each receiving channel, if cancellation is carried out by using this noise component signal, a noise component signal in the transmission signal can be removed reliably.

Note here that control circuit 303 inputs a phase control voltage directly. However, phase control voltage may be input via PLL circuit 208. When PLL circuit 208 receives receiving channel data from control circuit 303, it outputs a DC signal of the voltage according to the receiving channel to local oscillator 207. Therefore, by using the DC signal output from PLL circuit 208, noise level regulator 508b and phase changer 501b may be controlled. Also in this case, to noise level regulator 508b and phase changer 501b, the voltage according to the receiving channel is input, and the phase or level is changed in accordance with the receiving channel.

Furthermore, in this case, since memory 307 may not include a table for controlling thereof, the capacity of the memory can be reduced. Furthermore, in the third exemplary embodiment, when detector 216, level regulator 508, phase shifter 501, amplifier 504, mixer 206, local oscillator 207 and PLL circuit 208 are configured as an integrated circuit, a high frequency receiver can be miniaturized. Furthermore, since it is not necessary to additionally provide a terminal for inputting a control signal for controlling noise level regulator 508b and phase changer 501b, the integrated circuit itself can be miniaturized.

Forth Exemplary Embodiment

Figure 8:
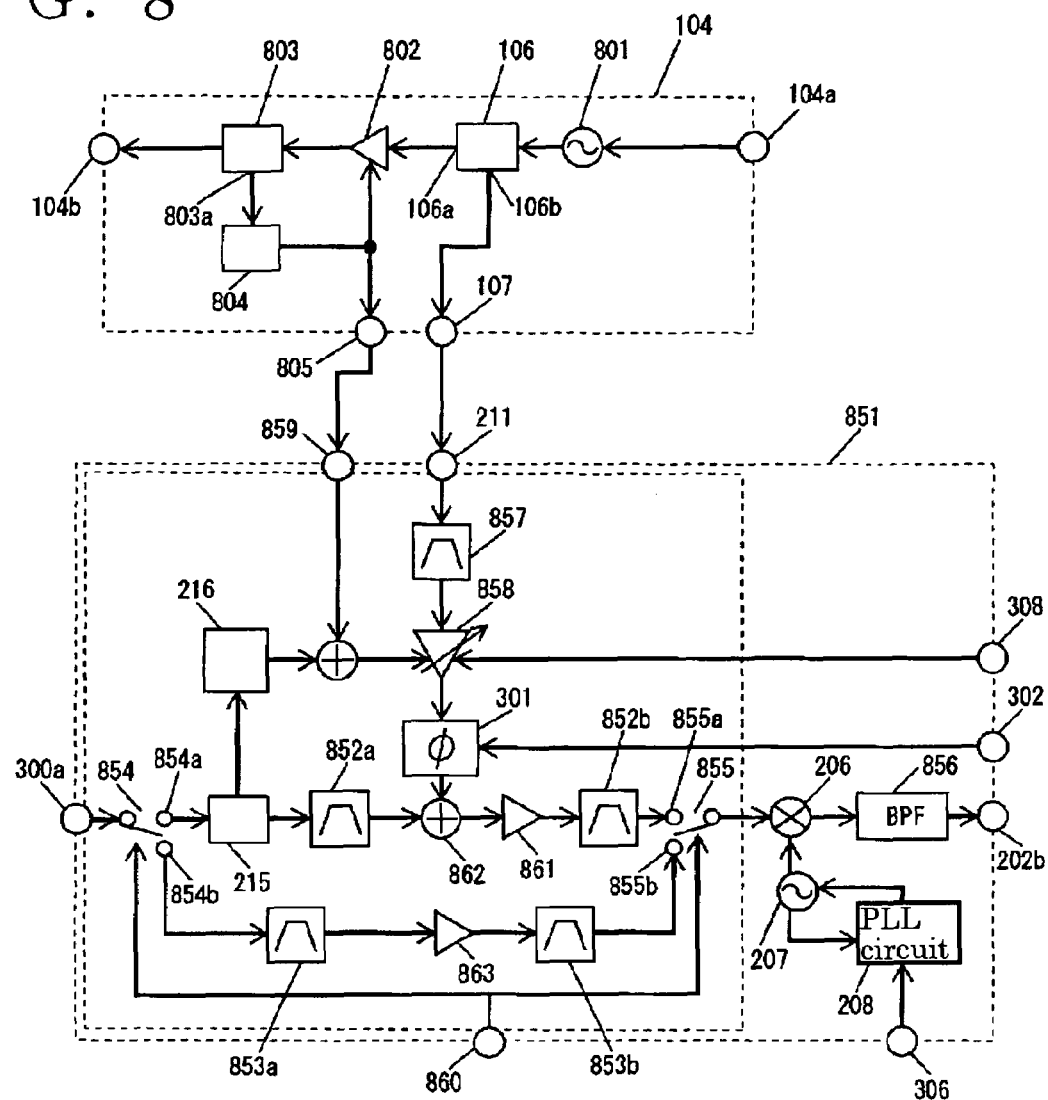
FIG. 8 is a block diagram showing a transmitter and a high frequency receiver in accordance with a fourth exemplary embodiment of the present invention.

A fourth exemplary embodiment is described with reference to FIGS. 8 and 9. FIG. 8 is a block diagram showing a transmitter and a high frequency receiver in accordance with the fourth exemplary embodiment. FIG. 9 shows a table in accordance with the fourth embodiment. In these figures, the same reference numerals are given to the same elements as those in FIG. 3 and the description therefor is simplified.

In the fourth exemplary embodiment, instead of transmission signal generation part 105 shown in FIG. 3, oscillator 801 is employed. To oscillator 801, a digital data signal input from input terminal 104a is input. This digital data signal directly modulates a transmission signal output from oscillator 801. Then, a transmission signal output from oscillator 801 is input to coupler (directional coupler) 106 and input to power amplifier 802 via output terminal 106a of coupler 106. On the other hand, from output terminal 106b of coupler 106 to output terminal 107, a signal distributed from a signal transmitted from the output terminal of oscillator 801 is input. Then, a transmission signal whose level of carrier wave was amplified to +33 dBm by power amplifier 802 is released into the air from transmitting antenna 1.

Note here that also between power amplifier 802 and output terminal 104b, coupler (directional coupler) 803 is coupled. Coupler 803 distributes a transmission signal output from power amplifier 802 and inputs it to detector 804 via terminal 803a. Detector 804 detects the level of input transmission signal and inputs a DC voltage according to the detected level to a gain control terminal of power amplifier 802 and transmission level output terminal 805.

Next, high frequency receiver 851 is described. In high frequency receivers 201 and 304 employed in the first and second exemplary embodiments, by synthesizing a signal input from an input terminal and a signal input from distributed transmission signal input terminal 211, carrier wave 224 is cancelled. However, phase shifter 212 or 301 shown in the first and second exemplary embodiment is required to accurately control the phase change amount with respect to signals of a plurality of frequencies. As a result, there are disadvantages that a configuration is complicated, a circuit becomes larger, and the cost becomes higher, and the like.

Then, in high frequency receiver 851 in accordance with the fourth exemplary embodiment, a noise component signal of oscillator 801 in a receiving channel of high frequency receiver 851 is cancelled. Furthermore, a carrier wave oscillated by oscillator 801 is removed by filter 852 or 853.

Next, the difference in the components between the fourth exemplary embodiment and the second exemplary embodiment is described. A high frequency signal input to antenna 21 (FIG. 1) is input to common terminal of switch 854 via input terminal 202a. First terminal 854a of switch 854 is coupled to narrow band filter 852a via coupler (directional coupler) 215. Narrow band filter 852a allows a frequency in the range of 814 MHz to 862 MHz to pass and attenuates a signal of 880 MHz that is a carrier wave.

Note here that narrow band filter 852a attenuates frequency 223 of the carrier wave of oscillator 801 by about 30 dB. Narrow band filter 852a can realize such a rapid attenuation property because the passband of narrow band filter 852a is limited to an extremely narrow frequency from 814 MHz to 862 MHz.

Synthesizer 862 synthesizes an output signal from narrow band filter 852a and an output signal from phase shifter 301 and outputs the synthesized signals to amplifier 861. An output signal from amplifier 861 is taken out to terminal 855a of switch 855 via filter 852b having the same attenuation property as that of narrow band filter 852a. A common terminal of switch 855 is coupled to the first input terminal of mixer 206. The signal output from the common terminal of switch 855 is mixed with an output signal taken out of local oscillator 207 coupled to second input terminal of mixer 206, and converted into an IF signal of 36 Hz. Band-pass filter 856, to which an output terminal of mixer 206 is coupled, removes frequency signals other than IF signals and outputs them from output terminal 202b.

Output terminal 107 is coupled to distributed transmission signal input terminal 211 in the housing of the portable equipment. To input terminal 211, a distributed transmission signal distributed from a transmission signal generated at oscillator 8 is input. Band-pass filter 857 coupled to input terminal 211 has a frequency band that allows frequency in the range of 814 MHz to 862 MHz among the distributed transmission signals to pass.

For band-pass filter 857, one that is the same as narrow band filter 852a is used. Variable gain amplifier 858 is one of level regulators. To amplifier 858, an output signal from band-pass filter 857 is input. A gain of amplifier 858 is controlled by an output signal from detector 216.

Detector 216 outputs a DC control voltage in accordance with the level of the transmission signal in the detected distributed receive signal. Thus, variable gain amplifier 858 changes the level of the distributed transmission signal in accordance with the input control voltage, and inputs it to phase shifter 301. Phase shifter 301 needs level correction in accordance with the channel to be received because a signal loss amount is different depending on the frequencies. Then, control circuit 303 corrects a voltage to be input from detector 216 to amplifier 858 in accordance with receiving channel. Thus, the gain of amplifier 858 is corrected to a gain having a size suitable for each receiving channel. A signal output from phase shifter 301 can reduce the level deviation by the receiving channel.

Second terminal 854b of switch 854 is coupled to band-pass filter 853a. Band-pass filter 853a allows frequency in the range of about 470 MHz to 814 MHz to pass. An output terminal of band-pass filter 853a is coupled to band-pass filter 853b via amplifier 863. The upper bound frequency of the passband of band-pass filter 853a is 814 MHz and frequency 223 of carrier wave 224 of the transmission signal is 880 MHz. That is to say, band-pass filter 853a can sufficiently attenuate the carrier wave existing in the frequency that is 64 MHz distant from the passband.

Next, an operation of high frequency receiver 851 is described. Firstly, when a frequency in the range of 474 MHz to 810 MHz is received, switches 854 and 855 are coupled to the sides of terminals 854b and 855b, respectively. At this time, as shown in Table 2, input power supplies of the circuits such as phase shifter 301, variable gain amplifier 858, amplifier 861, and the like, is turned off.

On the other hand, when high-frequency receiver 851 receives a frequency in the range of 818 MHz to 858 MHz, switches 854 and 855 are coupled to the sides of terminals 854a and 855a. At this time, as shown in Table 2, amplifier 863 is turned off. In this way, at the timing in which the circuit operation is not necessary, by turning off the input power supply with respect to the circuit, power consumption can be saved.

TABLE 2

| Receiving channel | Frequency (MHz) | Control voltage | Level regulator | Amplifier | Switch | Amplifier |
|---|---|---|---|---|---|---|
| CH21 | 474 | 0 V | OFF | OFF | b side | ON |
| ... | ... | | | | | |
| CH63 | 810 | | | | | |
| CH64 | 818 | 1.3 V | ON | ON | a side | OFF |
| ... | ... | | | | | |
| CH69 | 858 | 1.9 V | | | | |

Control terminals for switching switches 854 and 855 are coupled to control circuit 303 via terminal 860 of high frequency receiver 851. To control circuit 303, memory 307 is coupled. In memory 307, a table shown in FIG. 9 is stored. The table stores information on switching of switches 854 and 855 and ON/OFF control of each circuit, and control voltage input to phase shifter 301 and variable gain amplifier 858 for each receiving channel. Then, control circuit 303 controls switches 854 and 855, ON/OFF of each circuit, phase shifter 301 and amplifier 858 based on this table. Thus, phase shifter 301 and amplifier 858 are controlled by gain to have a phase amount suitable for the receiving channel.

From the above-mentioned configuration, when the frequency in the range of 474 MHz to 810 MHz is received, switches 854 and 855 are coupled to the sides of terminals 854b and 855b, respectively. Thus, band-pass filters 853a and 853b remove a signal of the carrier wave of 880 MHz from receive signals input to input terminal 300a.

On the other hand, when the frequency in the range of 818 MHz to 858 MHz is received, switches 854 and 855 are coupled to the sides of terminals 854a and 855a, respectively. In this case, the frequency of the carrier wave is attenuated by narrow band filter 852a. Furthermore, since a noise component signal included in the receive signal is adjusted in terms of the level and the phase by variable gain amplifier 858 and phase shifter 301 and synthesized in synthesizer 862, the noise component signal can be cancelled at the receiving channel. Thus, the carrier wave and a noise component signal of the receiving channel is suppressed from being input to amplifier 861 or mixer 206. Therefore, it is possible to suppress the output of distortion etc. in detection amplifier 861 or mixer 206. It is important that the phase of the noise signal input from phase shifter 301 and the phase of the noise component signal included in the receive signal input from narrow band filter 852a are different from each other by 180°.

Then, by synthesizing these signals by synthesizer 862, a noise component signal of the frequency in the receiving channel is cancelled from the receive signal. Thus, a noise component signal in the receiving channel of oscillator 801 is suppressed from being input to mixer 206. As a result, it is possible to prevent the problem that high frequency receiver 851 is interfered with the noise component signal. Therefore, regardless whether or not transmitter 104 is used, portable equipment capable of stably receiving television broadcasting can be provided.

Note here that a signal taken out of transmission level output terminal 805 is added to the output voltage from detector 216 via transmission level signal input terminal 859 in a housing of the portable equipment. Thus, since a distributed transmission signal is a signal before it undergoes amplification in power amplifier 802, with respect to distributed transmission signal, a gain of variable gain amplifier 858 can be changed in accordance with the gain of power amplifier 802. Consequently, variation of gains or the influence of temperature dependency of power amplifier 802 can be corrected.

Furthermore, the frequency for switching switches 854 and 855 to the sides of terminals 854b and 855b is set to 810 MHz. One reason is that a noise component signal of 810 MHz included in the receive signal has a level of −96 dBm on the basis of the receiving channel band width, so that it can be received by high frequency receiver 851 even under a weak electric field. Another reason is that the passband of narrow band filter 852a can be selected from the range of 814 MHz to 858 MHz, so that the level of the carrier wave of 880 MHz can be attenuated sufficiently.

One of the characteristics of the fourth exemplary embodiment is that by switching switches 854 and 855 at the frequency mentioned above, both the carrier wave and the noise component signal can be removed. However, when the frequency of the carrier wave is close to that of the receive frequency band, the interference by a transmission signal may not be removed sufficiently. In such a case, the passband of narrow band filter 852a is narrowed, and the attenuation amount of the frequency of the carrier wave is increased. Furthermore, in parallel to narrow band filter 852a, a narrow band filter having another passband is provided. Then, in these filters, by selecting at least one of these filter in accordance with the receiving channel, both the carrier wave and the noise component signal can be removed.

Furthermore, for the level regulator, variable gain amplifier 858 capable of adjusting a gain is used. Since amplifier 858 can carry out amplification, the level of the distributed transmission signal distributed by using directional coupler 106 can be reduced. Therefore, the loss of the transmission signal input to power amplifier 802 can be reduced and the increase in the power consumption due to the gain in power amplifier 802 can be limited. Furthermore, since no wasted loss of electric power is generated in the transmission signals output from power amplifier 802, stable transmission becomes possible.

Furthermore, at the upper stream side of variable gain amplifier 858, band-pass filter 857 is coupled. This is because a gain in amplifier 858 is reduced and power consumption is reduced. That is to say, amplifier 858 is required to amplify an amount obtained by deducing a coupling loss between transmitting antenna 1 and antenna 21 from the gain in power amplifier 802. For example, when the output level of power amplifier 802 is +33 dBm and the coupling loss is 10 dB, amplifier 858 has to amplify the carrier wave to the level of +22 dBm. Accordingly, in order to carry out the amplification to such a large level in amplifier 858, large power consumption is necessary as in power amplifier 802. Therefore, by providing band-pass filter 857 at the upper stream side of amplifier 858, only a noise component signal is allowed to be input to amplifier 858. This can reduce the gain in amplifier 858, thereby enabling the power consumption to be limited. Needless to say, this has also a secondary advantage of reducing heating value by power consumption.

Furthermore, since variable gain amplifier 858 is used, the level of a distributed transmission signal can be appropriately set easily in accordance with the degree of coupling between transmitting antenna 1 and antenna 21. Therefore, in the range in which amplification can be carried out by amplifier 858, regardless of the size of coupling loss between transmitting antenna 1 and antenna 21, synthesizer 862 can cancel a noise component signal.

Although in the fourth exemplary embodiment, phase shifter 301 that is the same as that in the second exemplary embodiment was used, phase changer 501b employed in the third exemplary embodiment may be used.

In addition, in the fourth exemplary embodiment, as band-pass filter 857, one that is the same as narrow band filter 852a is used. Furthermore, filter 852a is disposed in the front stage of synthesizer 862. This configuration allows the level of the carrier wave passing through filter 852a to match the level of the carrier wave output from phase shifter 301. Therefore, since the carrier wave is attenuated by filter 852a and further is cancelled by synthesizer 862, a high frequency receiver that is not likely to be interfered with the outside can be provided.

Furthermore, band-pass filter 857 is disposed at the side of high frequency receiver 851. However, this may be disposed at the side of transmitter 104. In this case, band-pass filter 857 is coupled between output terminal 106b of directional coupler 106 and output terminal 107. This configuration can reduce a load change due to the coupling between transmitter 104 and high frequency receiver 851.

Fifth Exemplary Embodiment

Figure 10:
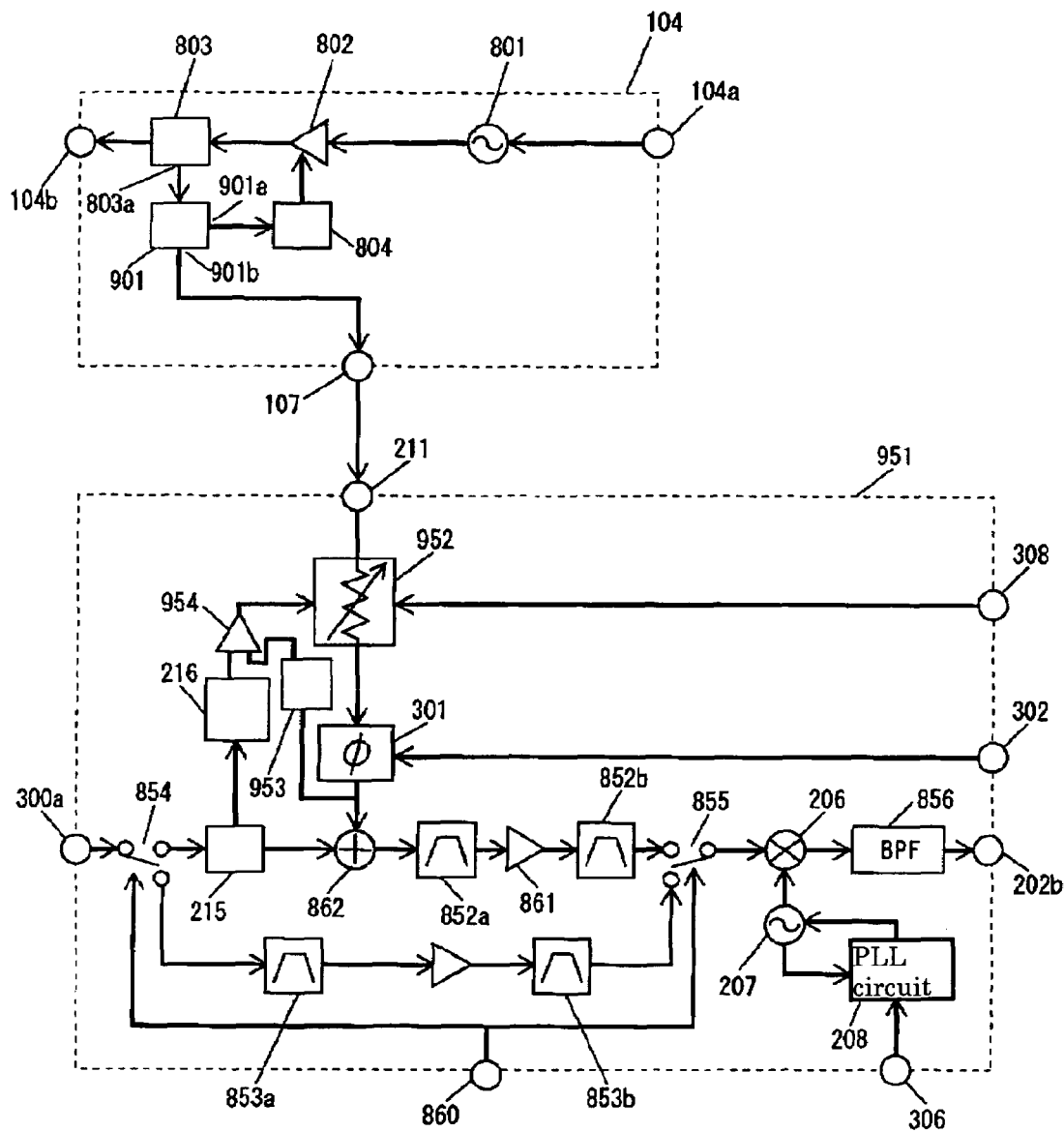
FIG. 10 is a block diagram showing a transmitter and a high frequency receiver in accordance with a fifth exemplary embodiment of the present invention.

A fifth exemplary embodiment is described with reference to FIG. 10. FIG. 10 is a block diagram showing a transmitter and a high frequency receiver in accordance with the fifth exemplary embodiment. In FIG. 10, the same reference numerals are given to the same elements as those in FIG. 8 and the description therefor is simplified.

The above-described fourth exemplary embodiment relates to the distribution from a transmission signal before it undergoes amplification in power amplifier 802. In the fifth exemplary embodiment, a distributed transmission signal distributed from a transmission signal after it undergoes amplification in power amplifier 802 is input to distributed transmission signal input terminal 211. A noise component signal of a transmission signal included in a high frequency signal input from input terminal 300a includes a noise at the time of amplification in power amplifier 802. Therefore, by distributing the transmission signal after it undergoes amplification in power amplifier 802, a noise due to amplification in power amplifier 802 can be also cancelled. Therefore, since a noise component due to power amplifier 802 can be also cancelled, high frequency receiver 951 is not likely to be interfered with transmitter 104.

Next, transmitter 104 is described. Between terminal 803a of directional coupler 803 and detector 804, distributor 901 is coupled. The first output 901a from distributor 901 is coupled to detector 804 and second output 901b is coupled to output terminal 107, respectively. In the above-described fourth exemplary embodiment, coupler (directional coupler) 106 for extracting a distributed transmission signal was necessary. However, in the fifth exemplary embodiment, it is not necessary that coupler 106 is additionally provided. That is to say, directional coupler 803 disposed for controlling the voltage of power amplifier 802 can be shared for extracting a distributed transmission signal. Therefore, a transmitter can be realized at low cost.

On the other hand, high frequency receiver 951 employs variable attenuator 952 as level regulator 305. That is to say, variable attenuator 952 attenuates the level of input signals to the level in accordance with the signal input to a control terminal. An output signal taken out of variable attenuator 952 is input to detector 953 and synthesizer 862 via phase shifter 301. Detector 953 detects the level of signal output from phase shifter 301. An output signal from detector 953 and an output signal from detector 216 for detecting the level of a distributed receive signal are input to differential amplifier 954. From differential amplifier 954, voltage difference between the signal input from detector 953 and the signal input from detector 216 is output.

Detectors 216 and 953 detect the levels of the distributed transmission signal and the distributed receive signal. Differential amplifier 954 outputs the voltage difference between signals output from their detectors. Then, by this voltage difference and voltage input to control terminal 308, feedback to variable attenuator 952 is carried out. Thus, since variable attenuator 952 undergoes feedback control by the level difference between the distributed transmission signal and the distributed receive signal, the level of the distributed transmission signal can be changed accurately and with high responding property. Therefore, since the difference between the level of the distributed transmission signal and the level of the transmission signal included in the high frequency signal input to input terminal 300a are allowed to match each other rapidly and reliably, the interference by the transmission signal can be improved reliably.

At this time, it is important that the level of the distributed transmission signal input from phase shifter 301 to synthesizer 862 matches the level of the transmission signal input from input terminal 300a to synthesizer 862. In addition to this, it is also important that the signal ratio of the carrier wave and the noise component signal is not changed. Therefore, narrow band filter 852a is coupled between synthesizer 862 and amplifier 861. Thus, the effect of change in the passing loss on the temperature of narrow band filter 852a is not likely to occur with respect to the interference cancellation at synthesizer 862.

Sixth Exemplary Embodiment

FIG. 11 is a detailed block diagram showing a phase shifter in accordance with a sixth exemplary embodiment. In FIG. 11, the same reference numerals are given to the same elements as those in FIG. 3 and the description therefor is simplified. Phase shifter 1001 can be used instead of the phase shifters employed in the first to fifth exemplary embodiments. This can follow the phase change amount of each phase shifter in accordance with the rapid phase change of an input signal caused by a Doppler effect, and the like.

Phase shifter 1001 is described with reference to FIG. 11. In phase shifter 1001, a distributed transmission signal input to distributed transmission signal input terminal 211 is input to input terminal 1001a. From output terminal 1001b, a distributed transmission signal whose phase was changed is output. Then, between terminal 1001a and terminal 1001b, phase shifter 1002 is coupled. Phase shifter 1002 changes the phase of the distributed transmission signal in accordance with a signal input to control terminal 1002a. To control terminal 1002a, terminal 1003 is coupled.

To terminal 1003, a control voltage (which was used as an example of control signals) for controlling the phase in accordance with the receiving channel is input from control circuit 303, and the phase amount of phase shifter 1002 is changed. Thus, phase shifter 1002 operates at the phase change amount in accordance with the receiving channel by a control signal input from control circuit 303. The voltage input to terminal 1003 is set to a voltage so that the phase difference between a distributed transmission signal output from phase shifter 1002 and a distributed receive signal becomes about 180°.

However, due to the vibration of transmitting antenna 1 or antenna 21, a Doppler effect occurs and the phase of a transmission signal received by antenna 21 is changed. That is to say, in such a state, the phase difference between the distributed transmission signal and the distributed receive signal changes instantaneously. Therefore, at this moment, since the phase difference between the distributed transmission signal output from phase shifter 1002 and the distributed receive signal deviates by approximately 180°, the interference cannot be cancelled sufficiently. Therefore, phase comparator 1006 is provided. By phase comparator 1006, a phase difference between the distributed transmission signal and the distributed receive signal is detected, thereby controlling the phase of phase shifter 1002. Therefore, a carrier wave component in the distributed transmission signal is input with respect to terminal 1004. This carrier wave is input to phase comparator 1006 via limiter circuit 1005. On the other hand, to terminal 1007, a distributed receive signal distributed by directional coupler 215 is input. The distributed receive signal is input to phase comparator 1006 via limiter circuit 1008. Note here that limiter circuits 1005 and 1008 are provided in order to equalize the amplitudes of signals output to phase comparator 1006.

Then, phase comparator 1006 detects the phase difference between the input distributed transmission signal and the distributed receive signal and outputs a pulse signal having a length corresponding to this phase difference. Phase comparator 1006 uses the same phase comparator as in a so-called PLL circuit. An output signal from phase comparator 1006 is input to the first input terminal of differential amplifier 1010 via loop filter 1009. Then, to the second input terminal of differential amplifier 1010, a reference voltage is input via terminal 1012. Then, an output signal from differential amplifier 1010 is added to a control signal output from control circuit 303 so as to be input to phase shifter 1002.

In nature, in a state in which a Doppler effect, etc. does not occur (hereinafter, referred to as "stationary state"), the phase difference between the distributed transmission signal and the differential receive signal is substantially constant. Accordingly, an output voltage value from a phase comparator in the phase difference in this stationary state (hereinafter, referred to as "stationary phase difference") is set as a reference voltage value. This reference voltage is input from terminal 1012 to the second input terminal of differential amplifier 1010.

Thus, in general, from differential amplifier 1010, voltage 0V is output. Thus, phase shifter 1002 is controlled by a control signal input from control circuit 303. Then, in the case where the phase difference is not a stationary phase difference due to a Doppler effect, and the like, a control voltage is input from differential amplifier 1010. This control voltage feedforward controls phase shifter 1002. In accordance with the phase difference detected by phase comparator 1006, the phase of the distributed transmission signal is changed so that the phase difference between the distributed transmission signal output from phase shifter 1002 and distributed receive signal is controlled and corrected to be about 180°.

By such a comparison between phases, the phase difference between the distributed transmission signal output from phase shifter 1002 and the distributed receive signal is controlled so as to be about 180°. Therefore, with respect to the phase change such as a Doppler effect, which occurs suddenly, or phase change due to the temperature change, the phase can be corrected and interference can be removed rapidly.

Furthermore, since phase shifter 1001 employed in the sixth exemplary embodiment carries out a feedforward control, it is particularly useful when phase changer 501b in accordance with the third exemplary embodiment is used instead of phase shifter 1002. That is to say, since phase changer 501b adjusts the phase of the noise component signal at the frequency of the channel to be received into a desired phase by the control voltage to be input, the phase change with respect to the frequency of the carrier wave has a different value depending on the frequencies to be received. Since phase comparator 1006 in accordance with the sixth exemplary embodiment compares the phases by the use of a carrier wave before it is input to phase changer 501b, the output from phase comparator 1006 is not influenced by the phase change of phase changer 501b.

Thus, instead of phase shifter 1002, phase changer 501b employed in the third exemplary embodiment can be used. As phase shifter 1001, phase shifter 501b having a simple circuit configuration can be used, and low cost and small size of high frequency receivers can be realized.

In the sixth exemplary embodiment, phase shifter 1002 carries out a feedforward control. However, a signal of the carrier wave included in a signal input to a synthesizer or synthesizing means may be used. For example, when a phase shifter (for example, phase shifters shown in the first to third exemplary embodiments) for changing both signals of the carrier wave and the noise component signal into a predetermined phase is used as phase shifter 1002, a signal output from output terminal 1001b is also input to terminal 1004. Thus, phase comparator 1006 compares phases of signals to be actually synthesized and feedback loop controls phase shifter 1002 so that the phases of the signals differ by 180° from each other. Therefore, the phase change amount can be controlled further accurately.

Note here that for controlling phase shifter 1002, while feedback loop control may be used, as phase shifter 1002, phase changer 501b may be used. In this case, memory 307 further stores reference voltage value in accordance with each receiving channel, and control circuit 303 inputs the reference voltage into terminal 1012. Thus, differential amplifier 1010 outputs voltage 0V when the phase difference is suitable for the receiving channel. Also in this case, since phase shifter 1002 is controlled by a signal that is input to a synthesizer or a synthesizing part actually, the phase change amount can be controlled accurately.

INDUSTRIAL APPLICABILITY

A high frequency receiver in accordance with the present invention has an advantage that a transmission signal can be cancelled by a transmitter included in the same housing and is useful when it is used for portable equipment such as a portable telephone equipped with a television. Therefore, the industrial applicability is high.

The invention claimed is:

1. A high frequency receiver provided in a same housing as a housing including a transmitter having a transmission signal generation part, having a frequency band of a receive signal in a vicinity of a frequency of a carrier wave of a transmission signal generated by the transmission signal generation part, and to which a high frequency signal including the receive signal and a transmission signal released from a transmitting antenna of the transmitter is inputted via an antenna, the high frequency receiver comprising:
an antenna input terminal to which the high frequency signal is inputted;
a mixer having a first input terminal to which the high frequency signal inputted to the antenna input terminal is inputted and a second input terminal to which an output signal from a local oscillator is inputted; and
an output terminal to which an output signal from the mixer is inputted,
wherein the high frequency receiver comprises
a distributed transmission signal input terminal to which at least a part of a distributed transmission signal obtained by distributing the transmission signal is inputted in the housing;

a phase shifter to which the distributed transmission signal inputted to the distributed transmission signal input terminal is inputted;

a detector for detecting a level of the transmission signal included in the distributed receive signal obtained by distributing the high frequency signal; and a level regulator having a first regulator input terminal to which an output from the detector is coupled and a second regulator input terminal to which the distributed transmission signal is inputted, and the level regulator changes a level of the distributed transmission signal in accordance with an output signal from the detector, and a signal input via the level regulator and the phase shifter and the high frequency signal are synthesized to be inputted to the mixer.

2. The high frequency receiver of claim 1, wherein the high frequency receiver has a transmission level signal input terminal to which a transmission level wave-detection signal obtained by detecting an output level of a power amplifier of the transmitter is inputted, and the transmission level wave detection signal and an output signal from the detector are inputted to the level regulator in which the level of the distributed transmission signal is changed in accordance with these signals.

3. The high frequency receiver of claim 1, comprising:

a phase changer provided in the phase shifter and changing a phase of the distributed transmission signal in accordance with a control signal to be inputted;

a phase controller for generating a control signal to control a phase change amount of the phase changer; and a memory coupled to the phase controller, wherein the memory includes a table storing the control signal to be inputted to the phase changer in accordance with a channel to be received, and the phase controller generates a control signal in accordance with the receiving channel based on the table and inputs it to the phase changer.

4. The high frequency receiver of claim 3, wherein the phase changer includes a variable-capacitance diode, and the control signal is a voltage to be inputted for changing the capacitance of the variable-capacitance diode.

5. A method of manufacturing the high frequency receiver of claim 3, the method comprising:

inputting a pseudo distributed transmission signal of a first signal level to a distributed transmission signal input terminal and inputting a pseudo transmission signal having a signal level that is different from the first signal level by a predetermined value and in which a phase is delayed by a value predetermined by the pseudo distributed transmission signal and a receive signal to be received by a high frequency receiver; and then receiving a receiving channel predetermined by the high frequency receiver;

the method further comprising, after the receiving, changing a control signal to be inputted to a phase changing part in a state in which the high frequency receiver receives the receiving channel and allowing a memory to store a signal that is outputted when a quality of a signal output from the output terminal is most excellent.

6. The high frequency receiver of claim 1, wherein the phase shifter includes:

a phase changer for changing a phase of the distributed transmission signal in accordance with the control signal to be inputted; and a phase control terminal to which a control signal from the phase controller coupled to the phase changer is coupled, to the phase control terminal, a control signal for controlling a phase change amount of the phase changer into a phase change amount corresponding to each receiving channel is inputted, and the phase changer changes a phase of the distributed transmission signal based on the control signal.

7. A transmitter provided in a same housing as a housing including the high frequency receiver of claim 6 and transmitting a signal having a frequency in a vicinity of a receiving frequency of the high frequency receiver from a transmitting antenna, the transmitter comprising:

an input terminal;

a transmission signal generation part to which a digital signal inputted to the input terminal is inputted and which generates a transmission signal, and a transmission signal output terminal to which an output from the transmission signal generation part is inputted and which inputs the transmission signal to the transmitting antenna, wherein the transmitter includes:

a power amplifier to which an output from the transmission signal generation part is coupled and which generates a noise into a frequency in a frequency band of a receive signal;

a first distributor to which an output from the power amplifier is inputted and which has a first distributor output terminal coupled to the transmission signal output terminal; and a distributed transmission signal output terminal coupled to a second distributor output terminal of the first distributor, and the first distributor distributes a transmission signal amplified by the power amplifier.

8. Portable equipment comprising a transmitter and a high frequency receiver for receiving a high frequency signal having a frequency in a vicinity of a carrier wave of a transmission signal of the transmitter in a same housing, the portable equipment comprising:

an antenna;

a high frequency receiver to which the high frequency signal inputted to the antenna is inputted;

a demodulator circuit to which an output from the high frequency receiver is coupled;

a decoder circuit to which an output from the demodulator circuit is coupled;

a voice output device and a display device to which an output terminal of the decoder circuit is coupled;

a voice input device;

an encoder circuit coupled between an output terminal of the voice input device and an input terminal of the transmitter; and a transmitting antenna to which an output signal from the transmitter is inputted, wherein the high frequency receiver comprises the high frequency receiver of claim 5, the transmitter comprises the transmitter of claim 7, and the distributed transmission signal output terminal and the distributed transmission signal input terminal are coupled to each other in the housing.

9. The high frequency receiver of claim 1,
wherein the phase shifter include:
a phase changer for changing a phase of the distributed transmission signal in accordance with the control signal to be inputted;
a phase control terminal to which a control signal from a phase controller coupled in order to control a phase change amount of the phase changer;
a phase comparator having a first comparator input terminal to which the distributed transmission signal is inputted and a second comparator input terminal to which the distributed receive signal is inputted; and
a low-pass filter to which an output terminal of the phase comparator is coupled, and
the phase comparator detects a phase difference between the distributed transmission signal and the distributed receive signal, and the phase changer changes the phase change amount in accordance with the phase difference.

10. The high frequency receiver of claim 1,
wherein the distributed transmission signal is a signal obtained by distributing the transmission signal before it undergoes amplification in a power amplifier of the transmitter.

11. The high frequency receiver of claim 10, comprising
a first band-pass filter coupled between the distributed transmission signal input terminal and the level regulator,
wherein the first band-pass filter allows a frequency of a transmission signal noise among transmission signals to pass and attenuates a frequency of a carrier wave.

12. The high frequency receiver of claim 11, comprising
a synthesizer coupled between the antenna input terminal and the mixer, and having a first synthesizer input terminal to which a high frequency signal is inputted and a second synthesizer input terminal to which a signal is inputted via the level regulator and the phase shifter.

13. The high frequency receiver of claim 12,
wherein a second band-pass filter is provided between the antenna input terminal and the first synthesizer input terminal of the synthesizer, a high-frequency amplifier is coupled between an output from the synthesizer and an input to the mixer, and the second band-pass filter allows a signal having a receive frequency to pass and attenuates the transmission signal.

14. The high frequency receiver of claim 13,
wherein both the first band-pass filter and the second band-pass filter allow the frequency of the transmission signal noise to pass and attenuate a frequency of the transmission signal.

15. The high frequency receiver of claim 14,
wherein the first band-pass filter and the second band-pass filter have same attenuation properties.

16. The high frequency receiver of claim 13, comprising
a third band-pass filter provided in parallel to the second band-pass filter; and
a switch coupled to the third band-pass filter and the second band-pass filter, and allowing any one of the second and third band-pass filters to selectively be coupled between the antenna input terminal and the mixer,
wherein a narrow band filter is used for the second band-pass filter and a passband of the third band-pass filter is set to be lower than a passband of the second band-pass filter.

17. The high frequency receiver of claim 12, comprising
a fourth band-pass filter provided between an output from the synthesizer and the mixer and to which an output from the synthesizer is coupled; and
a high-frequency amplifier coupled between the fourth band-pass filter and the mixer,
wherein the fourth band-pass filter allows a receive frequency signal to pass and attenuates a transmission signal.

18. The high frequency receiver of claim 17, comprising
a fifth band-pass filter provided in parallel to at least the fourth band-pass filter; and
a switch coupled to the fifth band-pass filter and the fourth band-pass filter and allowing any one of the output signals from the fourth and fifth band-pass filters to selectively be inputted to the mixer,
wherein a narrow band filter is used for the fourth band-pass filter and a passband of the fifth band-pass filter is set to be lower than a passband of the fourth band-pass filter.

19. The high frequency receiver of claim 1,
wherein the distributed transmission signal is a signal obtained by distributing a signal amplified by a power amplifier of the transmitter.

20. The high frequency receiver of claim 19, comprising
a synthesizer coupled between the antenna input terminal and the mixer and having a first synthesizer input terminal to which a high frequency signal is inputted and a second synthesizer input terminal to which a signal is inputted via the level regulator and the phase shifter.

21. Portable equipment comprising a transmitter and a high frequency receiver for receiving a high frequency signal having a frequency in a vicinity of a carrier wave of a transmission signal of the transmitter in a same housing,
the portable equipment comprising:
an antenna;
a high frequency receiver to which the high frequency signal inputted to the antenna is inputted;
a demodulator circuit to which an output from the high frequency receiver is coupled;
a decoder circuit to which an output from the demodulator circuit is coupled;
a voice output device and a display device to which an output from the decoder circuit is coupled;
a voice input device;
an encoder circuit coupled between an output from the voice input device and an input of the transmitter; and
a transmitting antenna to which an output from the transmitter is inputted,
wherein the high frequency receiver comprises the high frequency receiver of claim 14, the transmitter comprises the transmitter of claim 7, and the distributed transmission signal output terminal and the distributed transmission signal input terminal are coupled to each other in the housing.

22. A transmitter provided in a same housing as a housing including the high frequency receiver of claim 1 and transmitting a signal having a frequency in a vicinity of a frequency of a receive signal of the high frequency receiver from a transmitting antenna,
the transmitter comprising:
an input terminal;
a transmission signal generation part to which a digital signal inputted to the input terminal is inputted and which generates a transmission signal; and
a transmission signal output terminal to which an output from the transmission signal generation part is inputted and which inputs the transmission signal to the transmitting antenna;
wherein between an output from the transmission signal generation part and the transmission signal output terminal, a first distributor having an input coupled to an output from the transmitted signal generation part and one output signals coupled so as to be inputted to the transmission signal output terminal, and a distributed transmission signal output terminal coupled to another output from the first distributor are provided.

23. The transmitter of claim 22,
wherein the transmission signal generation part includes a local oscillator for generating an oscillation noise at least in a frequency band of a receive signal, and a power amplifier is coupled between the first distributor and the transmission signal output terminal.

24. The transmitter of claim 22,
wherein between the distributed transmission signal output terminal and the another output from the first distributor, a first band-pass filter is coupled, and the first band-pass filter allows a frequency of an oscillation noise of a local oscillator to pass and attenuates a signal having a frequency of a carrier wave.

25. The transmitter of claim 22,
wherein the transmission signal generation part comprises an oscillator, and a power amplifier to which an output from the oscillator is coupled, the power amplifier using a power amplifier that generates a noise in a frequency band of a receive signal, and a transmission signal output from the power amplifier is distributed by the first distributor and outputted.

26. The transmitter of claim 25, comprising
a second distributor to which the another output from the first distributor is coupled and which has a first output terminal coupled to the transmission signal output terminal; and
a coupling transmission level detector coupled between a second output terminal of the second distributor and an electric control terminal of the power amplifier.

27. Portable equipment comprising a transmitter and a high frequency receiver for receiving a high frequency signal having a frequency in a vicinity of a carrier wave of a transmission signal of the transmitter in a same housing,
the portable equipment comprising:
an antenna;
a high frequency receiver to which the high frequency signal inputted to the antenna is inputted;
a demodulator circuit to which an output from the high frequency receiver is coupled;
a decoder circuit to which an output from the demodulator circuit is coupled;
a voice output device and a display device to which an output from the decoder circuit is coupled;
a voice input device;
an encoder circuit coupled between an output from the voice input device and an input of the transmitter; and
a transmitting antenna to which an output from the transmitter is inputted,
wherein the high frequency receiver comprises the high frequency receiver of claim 1, the transmitter comprises the transmitter of claim 22, and the distributed transmission signal output terminal and the distributed transmission signal input terminal are coupled to each other in the housing.

28. A method of manufacturing portable equipment in which the transmitter of claim 22 and the high frequency receiver of claim 3 are provided in a same housing, the method comprising:
releasing a transmission signal generated by the transmitter from a transmitting antenna, inputting a high frequency signal including the transmission signal to an input terminal, and distributing a transmission signal in the housing and inputting it to a distributed transmission signal input terminal; and then
receiving a receiving channel predetermined by the high frequency receiver;
the method further comprising, after the receiving:
changing a voltage to be inputted to a phase changing part in a state in which the receiving channel is received and allowing a memory to store a voltage that is outputted when a quality of a signal output from the output terminal is most excellent.

29. An integrated circuit, comprising:
an antenna input terminal to which a high frequency signal is inputted;
a mixer having a first input terminal to which the high frequency signal inputted to the antenna input terminal is coupled and a second input terminal to which an output signal from a local oscillator is inputted;
an output terminal to which an output signal from the mixer is inputted; and
a PLL circuit loop-coupled to the local oscillator,
wherein the integrated circuit for the high frequency receiver comprises:
a distributed transmission signal input terminal,
a phase shifter to which a distributed transmission signal inputted to the distributed transmission signal is inputted,
a detector for detecting a level of the transmission signal included in a distributed receive signal obtained by distributing the high frequency signal, and
a level regulator having a first regulator input terminal to which an output terminal of the detector is coupled and a second regulator input terminal to which the distributed transmission signal is inputted, and the level regulator changes the level of the distributed transmission signal in accordance with the output from the detector and outputs a signal to be inputted via the level regulator and the phase shifter.

30. The integrated circuit of claim 29,
wherein the phase shifter comprises a phase changer for changing the phase of a distributed transmission signal in accordance with a control signal to be inputted, and the control signal is inputted via the PLL circuit.

* * * * *